US012392115B2

(12) United States Patent
Clarke et al.

(10) Patent No.: US 12,392,115 B2
(45) Date of Patent: Aug. 19, 2025

(54) SYSTEMS AND METHODS FOR POINT OF USE WATER MODIFICATION

(71) Applicant: The Procter & Gamble Company, Cincinnati, OH (US)

(72) Inventors: Colin John Clarke, Basingstoke (GB); Frantz Beznik, Brussels (BE); Anna L Connolly, Newcastle (GB); Dai Sanders, Warwick (GB); Grace Kane, Warwick (GB); Chris Jones, Tewkesbury (GB); Andrew Wallace, Long Itchington (GB); Benedict Taylor, Leamington Spa (GB); Miles Kilburn, Leamington Spa (GB); Stephen Wright, Warwick (GB)

(73) Assignee: The Procter & Gamble Company, Cincinnati, OH (US)

( * ) Notice: Subject to any disclaimer, the term of this patent is extended or adjusted under 35 U.S.C. 154(b) by 111 days.

(21) Appl. No.: 17/692,282

(22) Filed: Mar. 11, 2022

(65) Prior Publication Data

US 2022/0316191 A1 Oct. 6, 2022

Related U.S. Application Data

(60) Provisional application No. 63/168,287, filed on Mar. 31, 2021.

(51) Int. Cl.
*E03B 1/04* (2006.01)
*C02F 1/00* (2023.01)
(Continued)

(52) U.S. Cl.
CPC .............. *E03B 1/048* (2013.01); *C02F 1/003* (2013.01); *C02F 1/008* (2013.01); *C02F 1/685* (2013.01);
(Continued)

(58) Field of Classification Search
CPC ........ B01F 25/316; C02F 1/003; C02F 1/008; C02F 1/685; C02F 2103/002;
(Continued)

(56) References Cited

U.S. PATENT DOCUMENTS

| 5,307,650 A | 5/1994 | Mertz |
| 6,139,729 A | 10/2000 | Gonzalez, Jr. |

(Continued)

FOREIGN PATENT DOCUMENTS

| CN | 108298713 A | | 7/2018 | |
| CN | 110035781 A | * | 7/2019 | ........ A61M 5/14248 |

(Continued)

OTHER PUBLICATIONS

English Translation of CN 110035781 A . (Year: 2019).*

(Continued)

*Primary Examiner* — Terry K Cecil
(74) *Attorney, Agent, or Firm* — Kathleen Y. Carter; Matthew J. Spegele

(57) ABSTRACT

A water use management system may be installed in a setting that contains a primary infrastructure for water use to provide an alternate, modular infrastructure for water use. Fresh water used at various points of use, such as a shower or sink, may be modified by a point of use water conditioner. Water may be modified at the point of use based upon pre-configured routines or manual user selections. Treatments performed on the water may include quality treatments, such as modifying the pH or mineral content, and may also include experience treatments, such as the addition of scents, colors, carbonation, or health and beauty supplements. Additives used during treatment are provided in cartridges that may be inserted and removed from the water conditioner. Cartridges may self-identify when inserted, to (Continued)

aid in compatibility and usability determinations and recycling/recertification processes.

10 Claims, 22 Drawing Sheets

(51) Int. Cl.
 *C02F 1/68* (2023.01)
 *C02F 103/00* (2006.01)
 *F04B 53/14* (2006.01)
 *F04B 53/16* (2006.01)
(52) U.S. Cl.
 CPC ............ *E03B 1/042* (2013.01); *F04B 53/144* (2013.01); *F04B 53/16* (2013.01); *C02F 2103/002* (2013.01); *C02F 2201/006* (2013.01); *C02F 2209/008* (2013.01); *E03B 2001/045* (2013.01)
(58) Field of Classification Search
 CPC .......... C02F 2201/006; C02F 2209/008; E03B 1/041; E03B 1/042; E03B 1/044; E03B 1/048; E03B 2001/045; E03C 1/00; E03C 2201/40; E03D 5/003; E03F 5/0408; F04B 53/144; F04B 53/16
 See application file for complete search history.

(56) References Cited

U.S. PATENT DOCUMENTS

| | | | |
|---|---|---|---|
| 2009/0014383 A1 | 1/2009 | Owley | |
| 2011/0067769 A1 | 3/2011 | Stimpson | |
| 2012/0261352 A1 | 10/2012 | Kawasaki | |
| 2013/0015137 A1 | 1/2013 | Urmenyi | |
| 2013/0229346 A1 | 9/2013 | Jungbauer | |
| 2014/0054206 A1 | 2/2014 | Oregan, Jr. | |
| 2015/0069088 A1* | 3/2015 | Olson | B67D 1/10 222/129.1 |
| 2015/0344323 A1 | 12/2015 | Mahdjoubi Namin | |
| 2015/0368840 A1 | 12/2015 | Pollett | |
| 2016/0016836 A1 | 1/2016 | Sudnick | |
| 2016/0200601 A1 | 7/2016 | Clark | |
| 2018/0186656 A1 | 7/2018 | Drewniak et al. | |
| 2018/0312419 A1 | 11/2018 | Huang et al. | |
| 2018/0345532 A1* | 12/2018 | Randall | C04B 28/145 |
| 2018/0354432 A1* | 12/2018 | Van Beek | B60R 15/00 |
| 2019/0368167 A1* | 12/2019 | Ridell | E03B 1/042 |
| 2020/0248351 A1 | 8/2020 | Monsrud et al. | |
| 2020/0256041 A1 | 8/2020 | Kitagawa | |
| 2020/0300664 A1 | 9/2020 | Zhou | |
| 2021/0300804 A1 | 9/2021 | Broga et al. | |
| 2022/0162836 A1 | 5/2022 | Clarke et al. | |
| 2022/0315447 A1 | 10/2022 | Clarke | |
| 2022/0316190 A1 | 10/2022 | Connolly | |
| 2022/0325459 A1 | 10/2022 | Connolly | |

FOREIGN PATENT DOCUMENTS

| | | | |
|---|---|---|---|
| CN | 110670299 A | 1/2020 | |
| EP | 3369708 A1 | 9/2018 | |
| WO | 9405866 A1 | 3/1994 | |
| WO | 2007001488 A1 | 1/2007 | |
| WO | WO-2009115625 A1 * | 9/2009 | ............. C02F 3/006 |
| WO | 2015134887 A1 | 9/2015 | |
| WO | 2018081709 A1 | 5/2018 | |
| WO | 2018097788 A1 | 5/2018 | |

OTHER PUBLICATIONS

English Translation of WO 2009115625 A1 from PE2E database. (Year: 2009).*
PCT Search Report and Written Opinion for PCT/US2022/071081 dated Jun. 7, 2022, 20 pages.
PCT Search Report and Written Opinion for PCT/US2022/071083 dated Jun. 9, 2022, 14 pages.
All Office Actions; U.S. Appl. No. 17/527,240, filed Nov. 16, 2021.
All Office Actions; U.S. Appl. No. 17/692,276, filed Mar. 11, 2022.
All Office Actions; U.S. Appl. No. 17/692,286, filed Mar. 11, 2022.
All Office Actions; U.S. Appl. No. 17/692,274, filed Mar. 11, 2022.

* cited by examiner

| | | |
|---|---|---|
| WATER CHANNEL 202 | INJECTION PUMP 204 | USER INTERFACE 206 |
| POWER SOURCE 208 | CARTRIDGE RECEIVER 210 | COMMUNICATION DEVICE 212 |
| SENSOR MODULE 214 | FILTRATION MODULE 216 | PROCESSOR 218 |
| WATER TRANSPORT 224 | SECONDARY DEVICE CONNECTOR 220 | STORAGE RESERVOIR 222 |

SYSTEMS AND METHODS FOR POINT OF USE WATER MODIFICATION

FIELD

The present disclosure relates to systems and methods for managing domestic storage, treatment, and use of water.

BACKGROUND

Water scarcity is becoming an increasing problem for many countries, with the scale of the impact affected by multiple factors such as population growth, climate change and the increasing demands of both industry and agriculture. Thus, the demand for water is likely to become further strained in the decades ahead, and indeed many global cities face supply vs demand shortages than cannot be met by today's strategies. One approach to ensuring residential homes have sufficient resources to meet these scarcity challenges is the principle of re-use, in that certain water streams within the home are re-used or re-purposed for a secondary use, sometimes characterized as "greywater." Conventional approaches to such re-use focus on a "whole home" approach, and require significant initial costs (e.g., installation of hardware and infrastructure, reconfiguration of supply lines and drains, etc.) and maintenance costs (e.g., treatment, cleaning, especially around water waste classified as "sewage").

The resulting system may treat and divert multiple residential streams of water back to a single stream potable, or non-potable quality form for secondary re-use application (e.g., substantially all water used in the home is diverted to a single reservoir which feeds all future use). However, this potable or non-potable form is not optimized for any particular use and does not take into account the specific needs of the secondary purpose, and so in some cases the treatment of input water may be inefficient, unnecessary, or unsuitable based on the water's previous use and actual characteristics. Due to the high cost of implementation and maintenance, as well as the static, rather than dynamic or reactive, treatment of water, the scale of the savings realized by residential homes using conventional graywater systems is limited, and so they are not considered to be a feasible or realistic option for the majority of domestic users.

SUMMARY

In one form, a residential water supplementation system comprises a case configured to be positioned at a point of use within a residence. The system further comprises a water channel configured to receive a volume of water from a water source that is coupled to a water input of the water channel and provide the volume of water to a water output. The system further comprises one or more cartridge receivers. The system further comprises one or more injection nozzles in fluid communication with the water channel. The system further comprises one or more pumps, wherein each pump is coupled to at least one of the one or more cartridge receivers, is coupled to an injection nozzle of the one or more injection nozzles, and is operable to extract a volume of chemistry from a cartridge that is coupled to the at least one cartridge receiver and inject the volume of chemistry into the volume of water via the injection nozzle. The system further comprises a processor configured to cause the one or more pumps to modify the volume of water within the water channel based on a selected treatment.

In another form, a residential point of use reservoir device comprises a water capture device in fluid communication with a precedent use water, wherein the water capture device includes a sensor configured to provide a signal that indicates the presence of the precedent use water. The device further comprises a storage reservoir configured to hold a volume of water, and a first channel that provides a fluid connection between the water capture device and the storage reservoir. The device further comprises one or more cartridge receivers and one or more injection nozzles in fluid communication with the storage reservoir. The system further comprises one or more pumps, wherein each pump is coupled to at least one of the one or more cartridge receivers, is coupled to an injection nozzle of the one or more injection nozzles, and is operable to extract a volume of chemistry from a cartridge that is coupled to the at least one cartridge receiver and inject the volume of chemistry into the volume of water via the injection nozzle. The device further comprises a second channel that provides a fluid connection between the storage reservoir and a subsequent point of use, and one or more transport pumps configured to transport the precedent use water to the storage reservoir based on the signal from the sensor, and transport water from the storage reservoir to the subsequent point of use.

In another form, a method comprises providing a water supplementation unit configured to receive a volume of water from a water source and provide the volume of water to a water output. The method further comprises, by a processor, receiving a user input via a user interface of the water supplementation unit. The method further comprises, by the processor, determining a water modification associated with the user input. The method further comprises, by the processor and based on the water modification, causing a pump of the water supplementation unit to extract a volume of chemistry from a cartridge that is coupled to the water supplementation unit and inject the volume of chemistry into the volume of water.

BRIEF DESCRIPTION OF THE DRAWINGS

The above-mentioned and other features and advantages of the present disclosure, and the manner of attaining them, will become more apparent and the disclosure itself will be better understood by reference to the following description of non-limiting embodiments of the disclosure taken in conjunction with the accompanying drawings, wherein.

DETAILED DESCRIPTION

Figure 1:
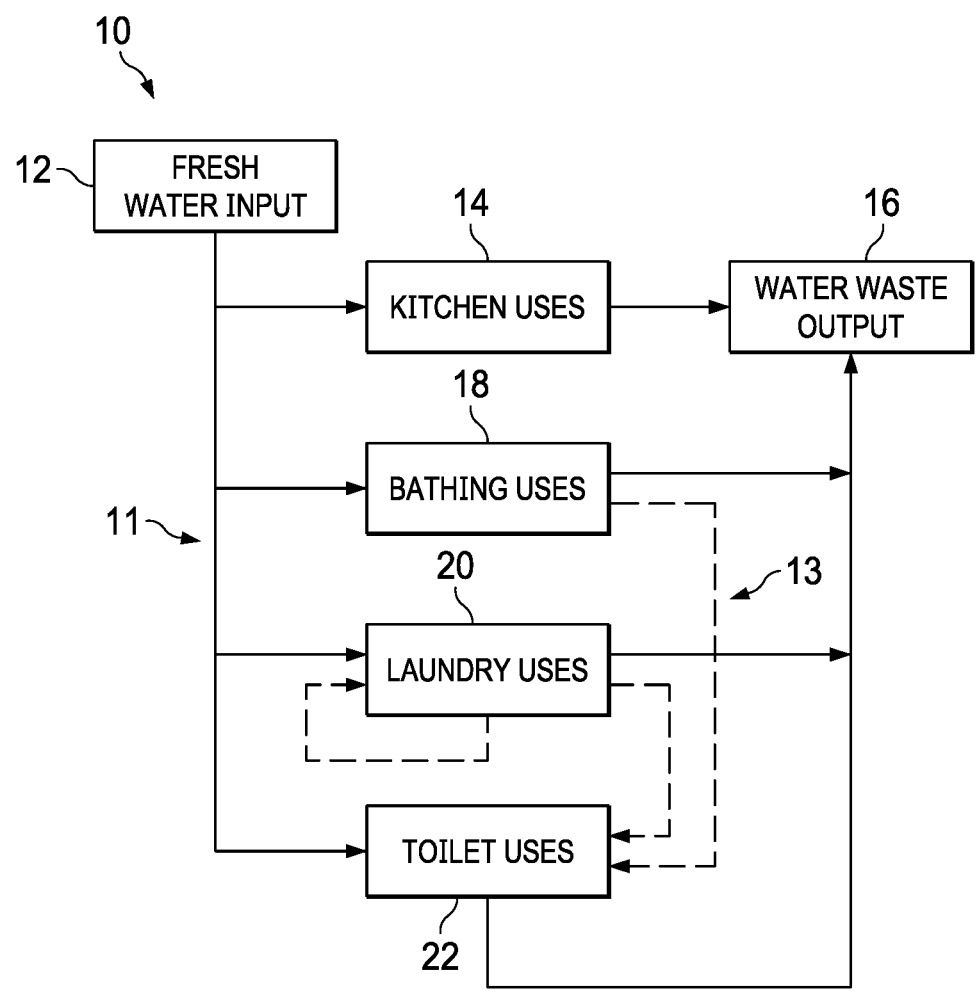
FIG. 1 is a schematic diagram illustrating exemplary water uses.

The present disclosure relates to systems and methods for managing the storage, treatment, and use of water in domestic environments. Various nonlimiting embodiments of the present disclosure will now be described to provide an overall understanding of the principles of the function, design, and operation of the systems and methods. One or more examples of these nonlimiting embodiments are illustrated in the accompanying drawings. Those of ordinary skill in the art will understand that the systems and methods described herein and illustrated in the accompanying drawings are nonlimiting example embodiments and that the scope of the various nonlimiting embodiments of the present disclosure are defined solely by the claims. The features illustrated or described in connection with one nonlimiting embodiment may be combined with the features of other nonlimiting embodiments. Such modifications and variations are intended to be included within the scope of the present disclosure.

One of the increasing concerns of consumers in a water scare world is the issue of water quality. Many consumers prefer bottled water to tap water due to perceived contaminant and health benefits. In a beauty context, many consumers are searching for different experiences and hair and skin benefits by the use of differing types and qualities of water. As an example, mineral water, rainwater, sparkling water, vinegar, and even champagne are touted as preferential cleaning and rinsing solvents as opposed to tap water. This 'alternative water trend' or 'premium water trend' is becoming more mainstream. In reality, there are genuine scientific reasons why some water types can have the ability to improve beauty outcomes, such as pH, where the natural pH of skin or hair is slightly acidic as compared to tap water. As a result, this may cause swelling of the skin or hair, which may affect their natural barrier functions.

Another example is hardness, where Ca/Mg and carbonates can also have some detrimental effects on the deposition of salts on skin or hair, and may form crystalline structures that disrupt surface quality, feeling, and appearance. An elevated acidity in water can prevent or remove crystalline deposits, leaving a smoother surface, which may be related to trends in using vinegar as a rinsing agent. As yet another example, transition metals can prove very aggressive to hair or skin due to the catalytic propagation of peroxidation reactions involving the body's natural oils and fats.

Some trends may be primarily due to perceived experiences rather than improved skin, hair, or other health benefits. For example, carbonated water has been used for bathing, and has been described as improving the 'experience' of rinsing, giving the consumer a pleasurable experience due to the nucleation of bubbles on the skins surface.

While some systems exist for water treatment, from softening systems to Ion exchange apparatus and nano filtration systems, these systems are conventionally focused on whole home treatment to convert grey water into potable water, rather than providing use-specific health or experience benefits. As a result, such systems are a major undertaking to install and maintain, and do not provide for use-specific flexibility or variability in type of treatment.

As disclosed herein, it may be advantageous to selectively treat only certain water streams, or certain water 'moments' that are provided at points of use such as a shower, sink, toilet, or other point of use. Such selective treatment allows for modular and focused treatment of waters at specific points of use, to provide specific benefits, rather than treating the whole water supply that is supplied to or used by a home. This allows for systems and devices of modest cost and complexity that treat only a portion of the water dispensed in a household, at the location, time, or both of the specific need or use (e.g., a duration of a shower, or certain portions of a shower such the rinse stage of a hair wash, or when body rinsing post cleansing). Implementations of these point of use devices may be inserted within, or exist in parallel with, existing water infrastructure (e.g., water supply lines, water drainage lines) without permanently modifying the existing infrastructure. In some implementations, point of use water treatment devices may be combined with systems that provide broader water use, capture, treatment, and re-use capabilities, such as the systems disclosed in U.S. Provisional Patent Application No. 63/118,176, filed on Nov. 25, 2020, the entire disclosure of which is incorporated by reference herein.

These point of use water treatment devices may be implemented with a small size, and may also use consumable and swappable cartridges that allow the water quality to be modified at the request of the user or via a programmed sequence. Such cartridges may contain chemical treatments to provide health benefits, experience benefits, or other changes, and may include cartridges configured to modify pH, provide carbonation, mineralization, or dispense specific liquids to improve beauty outcomes and experiences. These point of use devices may also incorporate water treatment modules (e.g., passive or active filtration systems) for the removal of specific metal ion species, such a transition metals.

Turning now to the figures, FIG. 1 shows a schematic diagram illustrating exemplary water uses within a domestic setting 10, such as a household. Primary infrastructure 11 related to water use (e.g., copper or plastic pipes providing fresh water, plastic drain pipes that divert used water to a sewage system) is illustrated as solid lines, while modular infrastructure 13, which may include point of use water treatment devices as described herein, are illustrated as dashed lines. Fresh water enters the domestic setting 10 via the primary infrastructure 11 from a fresh water input 12, which may be, for example, a water treatment plant or other public utility, a public water storage reservoir, a fresh water well, or another water table access point. Water provided by the fresh water input 12 is used in a variety of ways within the domestic setting, such as kitchen uses 14 (e.g., sink, dishwasher), bathing uses 18 (e.g., shower, sink), laundry uses 20 (e.g., washing machine), and toilet uses 22. In addition to providing water for various uses, the primary infrastructure 11 also provides drainage from those uses to a water waste output 16, such as a public sewage system, cesspool, or septic system.

As can be seen, the modular infrastructure 13 is more limited in the scope than the primary infrastructure 11. The modular infrastructure 13 may be encased within the structure of the domestic setting 10 (e.g., encased within walls, floors, or ceilings), or may be installed externally to such structures. The modular infrastructure 13 may include some aspects of the primary infrastructure 11, such as copper or plastic piping encased within structures, but may also include flexible tubing, flat tubing, temporary tubing with quick attach and release features, and other materials to aid in transport of water across relatively short distances and/or within a single room or adjacent rooms. In some implementations, the modular infrastructure 13 may also include transportable mobile elements, such as canisters, cartridges, or tanks that may be carried or otherwise conveyed (e.g., such as by rolling on a set of wheels) from location to location. In some implementations, the modular infrastructure 13 may include point of use water treatment devices that may receive fresh water, or treated water, and perform treatments on demand at a point of use, as will be described in more detail below.

While the particular layout and design of the modular infrastructure 13 will depend upon particular households and varying implementations, and may also change from to time as modular connections are added or removed, FIG. 1 shows several exemplary connections that are generally effective. For example, water that is used for bathing uses 18, generally in a bathroom, may be captured by the modular infrastructure 13, treated and stored, as will be described in more detail below, and then redirected for toilet uses 22 rather than flowing to the water waste output 16. Similarly, water that is used for laundry uses 20 may be captured by the modular infrastructure 13 and then re-used one or more times for laundry uses 20, after treatment and storage, and then redirected for toilet uses 22. Water used for toilet uses 22 is generally too difficult to treat in a manner that is both efficient and acceptable for wide use, and so may be diverted directly to water waste output 16. In other implementations, the modular infrastructure 13 may provide captured water for other subsequent uses, such as for watering plants or lawns, and may capture water from additional sources, such as dishwashers, kitchen sinks, or rain water from a roof or gutters. A significant advantage of the modular infrastructure 13 is its minimal footprint and application, as compared to conventional whole home water re-use systems. Significant gains in efficiency, ease of use, and cost of maintenance are possible by implementing the modular infrastructure 13 in a limited way, and utilizing it based upon various dynamic factors such as sensor data, usage history, user requests, and other inputs as will be described in more detail below.

Figure 2:
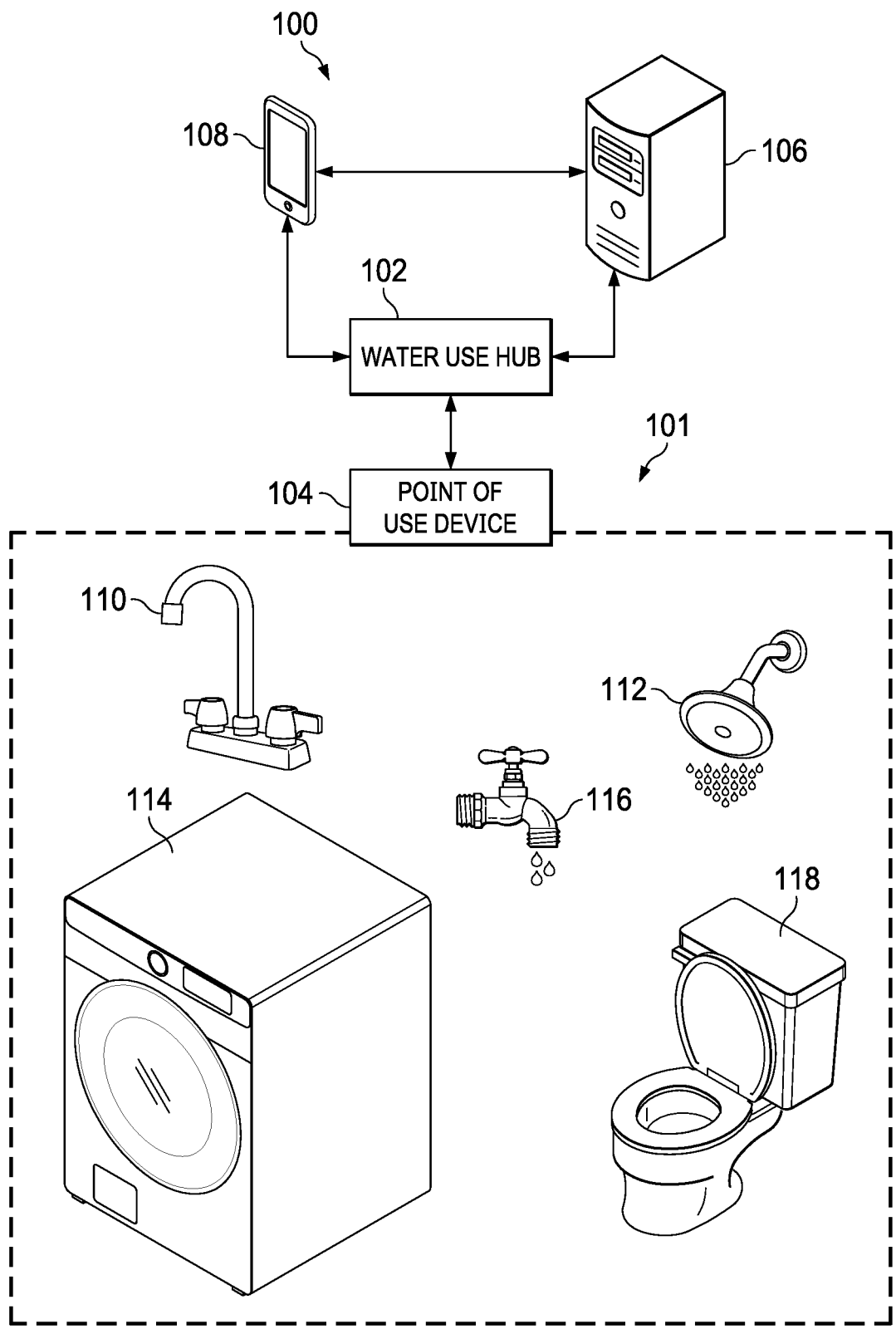
FIG. 2 is a schematic diagram illustrating an exemplary system for managing water use.

FIG. 2 is a schematic diagram illustrating an exemplary system 100 for managing water use. The system 100 may be implemented to enable some or all of the aspects of FIG. 1, such as using the modular infrastructure 13 to allow water management outside of the primary infrastructure 11. Points of use 101 illustrated in FIG. 2 include a sink 110 (e.g., within a bathroom, and intended primarily for handwashing and dental hygiene), a shower 112, and a toilet 118, which are typically grouped into the same room or at least proximately located to each other within the setting, as well as a washing machine 114, and an outdoor faucet 116, typically located in other rooms and at varying distances from each other and from other points of use. One or more point of use devices 104 may be installed and configured for one or more of the points of use 101 to enable such features as water modification at the point of use, real time or on demand water modification, water capture, treatment and re-use, and other beneficial features.

While not required in all implementations, the exemplary system 100 depicted in FIG. 2 also includes a water use hub 102, which is in communication with one or more devices such as point of use devices 104, and which itself is in communication with one or more remote servers 106 and one or more user devices 108. The water use hub 102 may communicate with point of use devices 104 and enable communication between those devices and a user device 108, remote server 106, or other point of use devices 108. As an example, this may allow a user with a smartphone 108 to remotely configure and interact with point of use device 104. The water use hub 102 may be a computer, a router, hub, switch, or other network device, or a proprietary device having adequate processing, storage, and communication capabilities to allow wired and/or wireless transmission and receipt of data, as well as processing, storage, and analysis of data. In some implementations, the water use hub 102 may be a smartphone or other personal computing device in the possession of a person within the setting, and so may also be a user device 108. Wired data connections may be by USB, Ethernet, broadband over power lines, or other wired connections. Wireless data connections may be Wi-Fi, Bluetooth, IR, NFC, or other short, medium, or long range wireless transmission. The remote server 106 may be one or more physical, virtual, cloud, or other server environments configured to transmit and receive data over a wide area network (e.g., the internet), and to store, modify, and analyze data. The user devices 108 may include one or more smartphones, tablets, computers, laptops, wearable devices, gaming device, proprietary devices, or other personal computing devices such as might be in the possession of a person inhabiting or visiting the location at which the system 100 is implemented.

Referring to FIGS. 1-2, data exchanged between the water use hub 102 point of use devices 104 may include, for example, usage data indicating volumes and occurrences of water entering and exiting the network, water entering the system from the fresh water input 12, water exiting the system via the water waste output 16, the status of point of used devices 104, which may include battery charge level, filter status, cartridge status and fill level, and other information. As an example, the point of use devices 104 may from time to time communicate via a wireless LAN and report general status information to the water use hub (e.g., currently in use, volume of water dispensed over period of time, battery level, cartridge fill level, cartridge contents, or other information, water temperature) as well as targeted notifications (e.g., change battery warning, change or replace cartridge warning, detection of leaky faucet, dangerous water temperature warning, or other warnings).

Data available to the water use hub 102 might also include sensor data describing characteristics of water used at points of use 101. This may include data from sensors capable of determining various characteristics of volumes of water. Such information might be used by point of use devices 104 or other devices to evaluate and prepare captured water for subsequent uses, and may be reported to the water use hub 102 so that it may be used for other purposes such as identifying ways to improve the overall quality of water in a household, to detect the presence of contaminants, or to suggest different products (e.g., chemical treatment cartridges, filtration modules) that may improve or reduce the level of chemical contaminants present in water at the point of use 101.

Data gathered by the water use hub 102 may be provided to a remote server 106 and used as part of aggregate information on water use across a group of users or a geographical area from which it originated, for example, and may be used to produce and refine configurations of the a plurality of systems 100 across many users. For example, data reported from a plurality of users within a single city may indicate that most or all residents of the city receive water with an undesirably high mineral content from the fresh water input 12. Such information may be used to remotely configure many point of use devices 104 within that city, to account for and treat the known high mineral content. The water use hub 102 and/or server 106 may also use gathered data to communicate with the user device 108 and provide information, recommendations, and other data to users via a one or more graphical user interfaces. For example, the user device 108 may receive a notification indicating high mineral content in the fresh water input 12, and recommending a whole-home water softener or other solution. As another example, the user device 108 may receive a notification indicating that, based on their historic and/or configured usage patterns, if they can wash a load of laundry at 9 p.m. instead of at 7 p.m., the entire water usage for that wash will come from re-used water that will be available at that time, instead of from the fresh water input 12. As another example, the user device 108 may receive a notification indicating that a chemical cartridge fill level for a point of use device 104 is low and should be replaced.

Figures 3, 4:
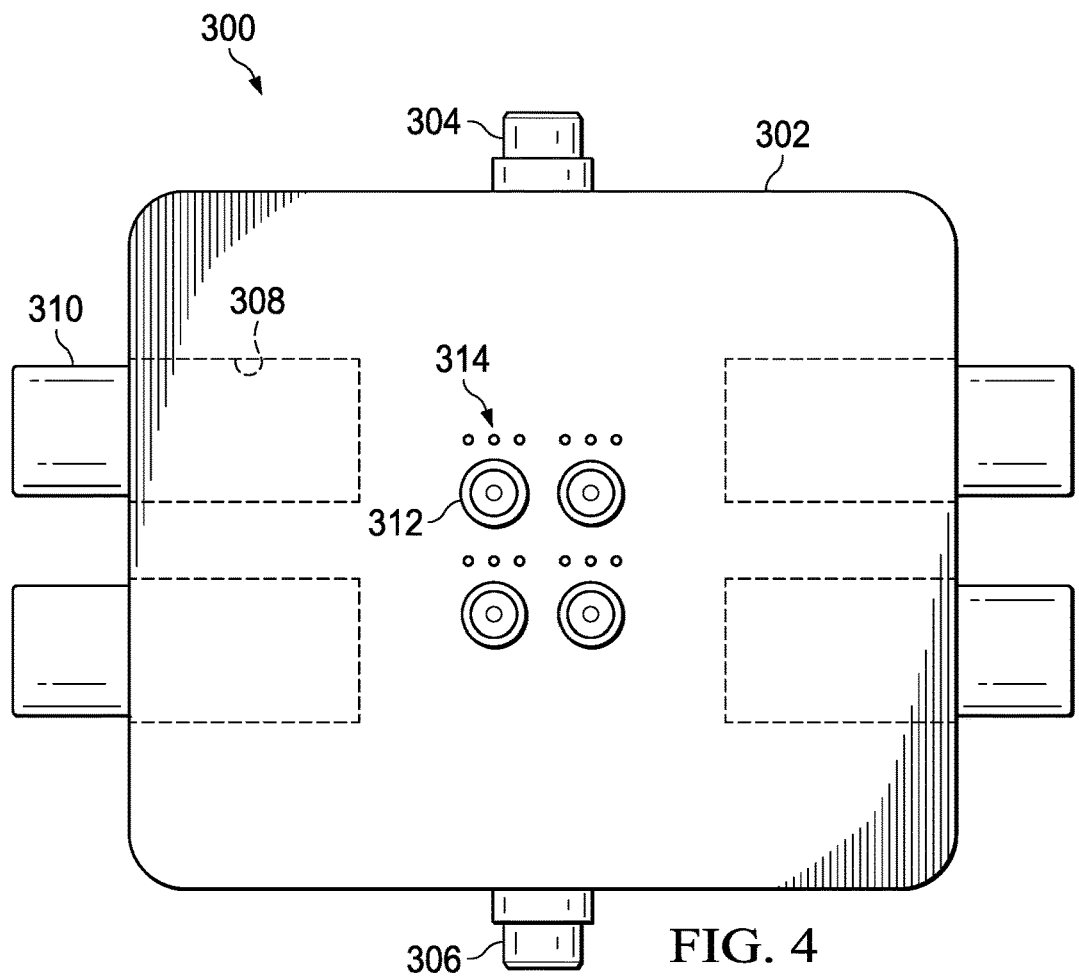
FIG. 3 is schematic diagram of an exemplary point of use water conditioner.
FIG. 4 is a front elevation view of an exemplary point of use water conditioner.

As further example of a point of use device 104, FIG. 3 shows a schematic diagram of a point of use water conditioner 200, which may also be referred to as a residential water supplementation unit, that is operable to modify water at a point of use such as a shower. Water modifications may include, for example, filtering, injection of chemical treatments (e.g., to modify pH), and injection of user experience treatments (e.g., to provide scented water, colored water, or carbonated water). The water conditioner 200 includes a water channel 202 that receives water as input from the fresh water input 12 or another source, and transports the water to an output at the point of use (e.g., a shower head). Filtering, treatment, and other modifications to the water may be performed on water while it is traversing the water channel 202. In varying implementations, the water channel may include one or more inputs (e.g., one input for fresh water 12, and one for water input from modular infrastructure 13), and one or more outputs (e.g., one output for a point of use such as a shower head 112, and one for a peripherally attached device such as a handheld shower).

The water conditioner 200 may include one or more injection pumps 204 that are operable to introduce chemistry such as an additive to water flow in the water channel 202. In varying implementations, injection pumps 204 may draw additives from an internal reservoir, or may draw additives from a cartridge or other external replaceable reservoir. In cartridge based implementations, the water conditioner 200 may include a cartridge receiver 210 that receives a cartridge containing chemical treatments, user experience treatments, or other additives, and provides such additives to the injection pumps 204. Cartridge receivers 210 may include additional features, such as optical, electrical, or wireless data readers or receivers operable to receive information from an inserted cartridge that is usable to identify the cartridge and its contents, or enable/disable other features of the water conditioner 200 based upon an inserted cartridge, as will be described in more detail below.

The water conditioner 200 may include a user interface 206 that allows a user to provide inputs to the water conditioner 200, receive information from the water conditioner 200, or both. The user interface may include, for example, a display screen, a touch screen, a set of light indicators or other visual indicators, a set of buttons or other controls, voice activation features, or a software interface accessible wirelessly from another device (e.g., such as a smartphone connecting to the water conditioner 200 via Bluetooth or Wi-Fi). The user interface 206 may be configured to allow a user to activate certain water treatments, create and change software configurations of the water conditioner 200, receive information relating to the function of the water conditioner 200 such as operational status, cartridge contents, cartridge levels, and receive warning messages or other notifications relating to the function of the water conditioner 200.

The water conditioner 200 may include other features and components such as power sources 208 (e.g., a rechargeable/replaceable battery, hardwired connection, power cable), communication devices 212 (e.g., Bluetooth transceivers, Wi-Fi transceivers, optical transceivers, or other devices capable of receiving and transmitting data wirelessly or via a hardwired connection), processors 218 (e.g., one or more computer processors within the water conditioner 200 or within a device in communication with the water conditioner 200, that are configured to execute programming instructions and exchange control signals with other devices of the water conditioner 200 such as the injection pumps 204, user interfaces 206, and others), as well as components such as memories, storage devices, sealants against water and humidity, for example. One or more processors 218 may also include computer processors of varying types including microprocessors, and may also include control boards, programmable logic devices, field programmable gate arrays, and other devices capable of receiving an input signal, determining an output signal, and providing the output signal to one or more other devices or components.

The water conditioner 200 may include a sensor module 214 that includes one or more sensor capabilities such as flow sensors, pressure sensors, contaminant sensors, water characteristic sensors (e.g., for determining pH, hardness, clarity), temperature sensors, motion sensors, proximity sensors, sound sensors, optical sensors, or other sensor devices capable of measuring physical characteristics of the proximate environment and generating datasets for use by the processor 218. Characteristics measured by sensors may include, for example, water temperature, mineral content, acidity, chemical content, particulate content, microbial content, fungal content, viral content, and biochemical oxygen demand.

The water conditioner 200 may also include a filtration module 216, which may include one or more filtration membranes, chambers, or substances, and may be positioned inline along the water channel 202, prior to the water channel 202 and external to the water conditioner 200 itself (e.g., inline along a hose or other channel that provides fresh water 12 to the water conditioner 200), or after the water channel 202 and external to the water conditioner 200 (e.g., inline along a hose or other channel that provides post-modification water to a point of use such as a shower 112).

In some implementations, the water channel 202 may have two or more outputs, with one output providing post-modification water to a point of use such as the shower 112, and a second output terminating at a secondary device connector 220. The secondary device connector 220 may be configured to couple with any of a variety of secondary devices to allow for post-modification water to be provided selectively to the shower 112, a connected secondary device, or both simultaneously. Examples of a secondary device include a handheld shower head separate from the primary shower head, a water dispensing toothbrush, a water dispensing hairbrush, a water dispensing body scrub brush, and a water dispensing razor, for example. Secondary devices may receive a steady stream of water from the water conditioner 200 based upon the operation of a passive or active valve system within the water channel 202 and/or secondary device connector 220, or may include their own supply valve that controls the flow of water by pressing a button or adjusting another control, or both.

In some implementations, the water conditioner 200 may additionally be configured for point of use water capture and re-use via modular infrastructure. Such implementations may additionally include one or more storage reservoirs 222. The storage reservoir 222 may be inline with, or otherwise in fluid communication with the water channel 202, such that water received via some or all of the water inputs passes into the storage reservoir 222, and water from the storage reservoir 222 may flow out of the water conditioner 200 via one or more water outputs. Water provided by the water conditioner 200 may be from the fresh water input 12 that bypasses the storage reservoir 222 completely, may flow from the storage reservoir 222, or may be a mix.

Water that is provided to the storage reservoir 222 may be stored and initially treated, or treated over time, while water bypassing the storage reservoir 222 may be treated and provided in real-time. Water provided to the storage reservoir 222 may be from the fresh water input 12, or may be water captured from a point of use via modular infrastructure 13. Water captured for treatment in the storage reservoir 222 during a precedent use may be treated, and then provided from the storage reservoir 222 for a subsequent use, and is typically captured prior to entering the primary infrastructure 11 (e.g., captured prior to entering a drain). Components of the water conditioner 200 related to water modification (e.g., the injection pump 204, the cartridge receiver 210, and the filtration module 216) may operate to treat water that bypasses the storage reservoir 222, water stored within the storage reservoir 222, or both. For example, where a water conditioner 200 may receive four cartridges including water modification chemistry, additive from each cartridge may be used to treat water in real-time or in the storage reservoir 222, or cartridges may be dedicated to particular uses (e.g., two cartridges may be used to treat water bypassing the storage reservoir 222, while two cartridges may be used to treat water within the storage reservoir 222).

Implementations of the water conditioner 200 having a storage reservoir 222 may also include a water transport device 224, which may be, for example, a pump that is operable to create pressure and/or vacuum in order to transport water within a closed system. The water transport device 224 may be operable to capture water from a point of use and transport it to the storage reservoir, and may be used to transport water from the storage reservoir into the water channel 202 for a subsequent use.

Figure 5:
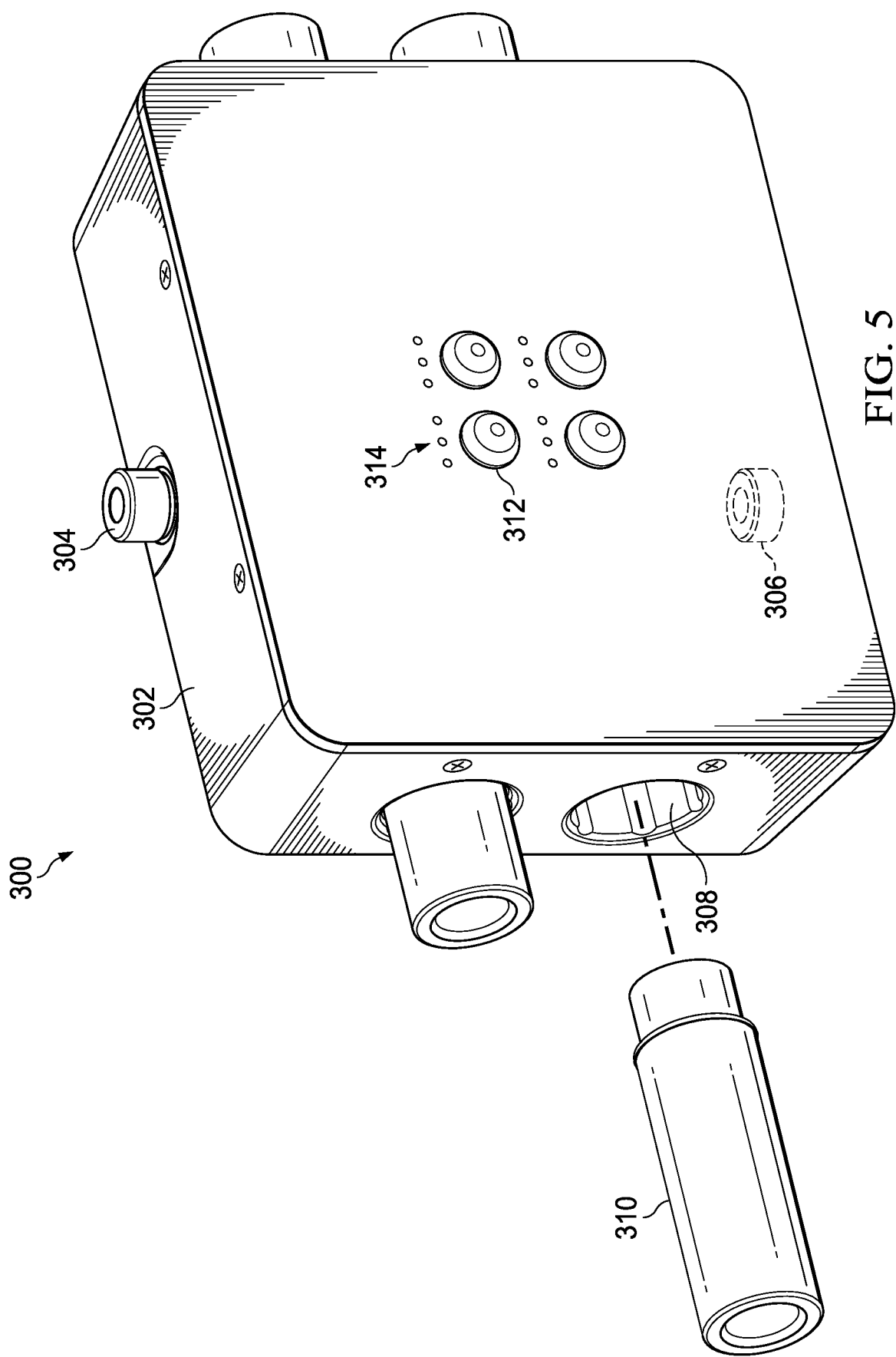
FIG. 5 is a front perspective view of the point of use water conditioner of FIG. 4.

FIG. 4 is a front elevation view of a point of use water conditioner 300. The water conditioner 300 has a shape, size, and other physical characteristics that would make it suitable for placement near a shower 112, thought it should be understood that any of the concepts, features, or methods described herein may also be applied to other points of use, such as a sink 110, washing machine 114, or toilet 118. Accordingly, to the extent that the disclosure describes such concepts, features, and methods in relation to a shower 112, such description is merely for the sake of illustration and clarity, and should not be interpreted as a limitation on that disclosure to application in a shower 112. The water conditioner 300 includes a case 302, a water input 304 extending from the case, and a water output 306 extending from the case. While the water input 304 and water output 306 are shown on the top and bottom sides of the case 302 respectively, it should be understood that they may be positioned elsewhere, and so for example each may be positioned on a top of the case 302, on the bottom of the 302, or on opposite sides of the case 302, for example. The water conditioner 300 includes four cartridge receivers 308, with two positioned on each side of the case (e.g., a cartridge receiver 308 is also shown in FIG. 5), which define a recess extending into the case 302, and that are shaped to receive a cartridge 310. The cartridge receiver 308 ma also include one or more protrusions onto which a cartridge 310 is received. Cartridges 310 removably attached to a cartridge receiver 308 may include chemical treatments, experience treatments, or other additives that may be injected into the water by a device such as the injection pump 204, and may also contain aspect of the filtration module 216, such as filtration membranes or chambers that may be easily replaced by swapping the exhausted filter cartridge for a replacement cartridge.

A front of the case 302 includes a set of buttons 312 and a set of status indicators 314 which may correspond to one or more buttons. Buttons 312 may each correspond to a single cartridge, such that actuating a button causes an additive from the corresponding cartridge 310 to be injected into the water stream. Operation of the buttons 312 may vary by implementation. As an example, in some implementations pressing a button 312 may supply a static amount of additive each time over several injections, while in other implementations pressing a button 312 several times within a short period of time may cause an increasing amount of additive to be subsequently supplied in a single injection. The status indicators 314 may be, for example, light indicators operable to emit varying colors of light at varying magnitudes. The status indicators 314 may be operated to provide information on the operation of the water conditioner 300, with lighted indicators indicating an in-process or upcoming water modification (e.g., three lights may be illuminated in response to three presses of a corresponding button), or indicating a status of a corresponding cartridge 310 (e.g., 3 lights for a near full cartridge, 1 light for a near empty cartridge), or both in varying operation modes. The status indicators 314 may also operate in other modes, such as to provide errors, warnings, notifications, or other information.

FIG. 5 is a front perspective view of the point of use water conditioner 300, shown with a cartridge 310 removed from the cartridge receiver 308, and three other cartridges still coupled to their respective cartridge receivers. While the cartridges 310 are illustrated as cylinders, it should also be understood that they may be implemented in varying shapes, sizes, or with other varying physical characteristics. Additionally, it should be understood that while the cartridge receivers are shown on opposite sides of the case 302, in some implementations they may instead be distributed about a top, bottom, or on the front of the case 302.

Figure 6:
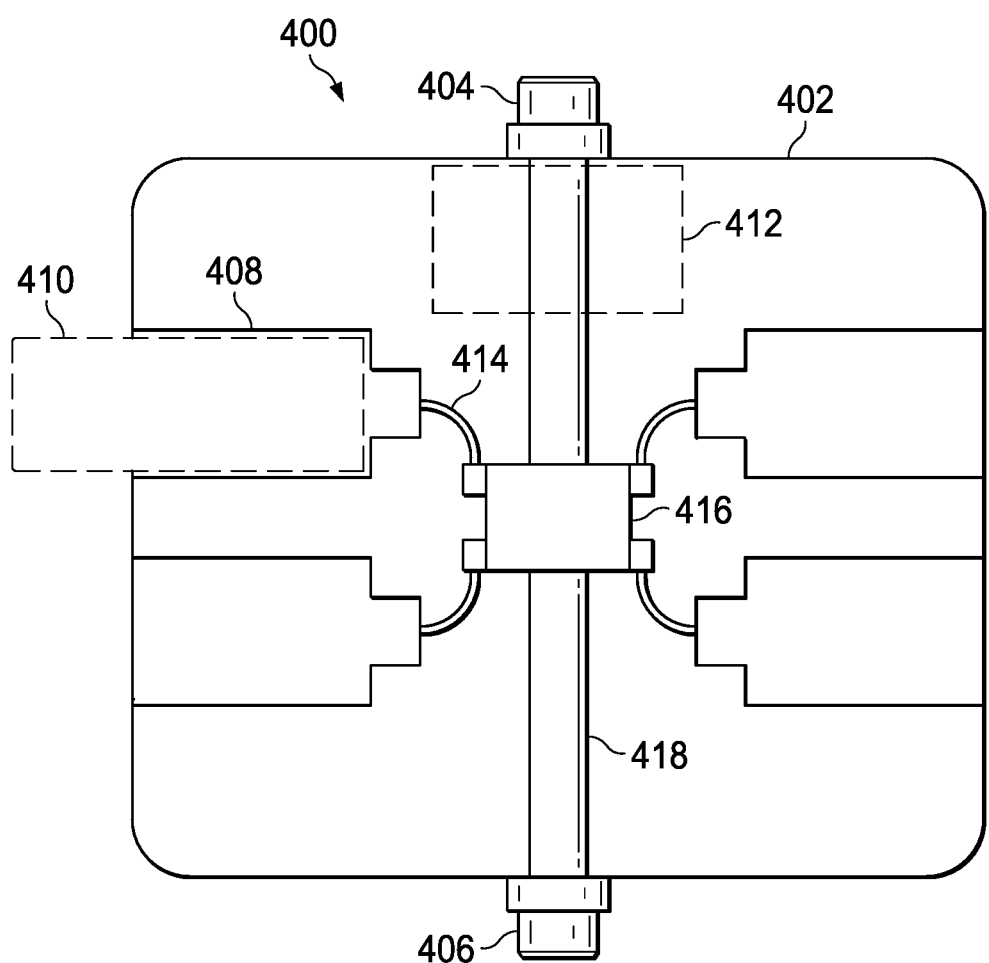
FIG. 6 is a schematic diagram of an exemplary interior configuration of a point of use water conditioner.

FIG. 6 is a schematic diagram of an exemplary interior configuration of a point of use water conditioner 400. A water input 404 at a top of a case 402 leads to an internal water channel 418 which runs from the water input 404 to a water output 406 at a bottom of the case. The water input 404 and water output 405 may have varying types of connectors, such as threaded connectors or push connectors, and may incorporate additional mechanisms for locking, sealing, or otherwise fastening the connection to prevent leaks.

Four cartridge receivers 408 are illustrated in positions generally matching those of the water conditioner 300 (e.g., two on each side of the case 402), and the position of a cartridge 410 within the upper left cartridge receiver 308 is illustrated by dashed lines. An injection pump 416 is shown connected to each cartridge receiver 408 by a supply line 414. The injection pump 416 is coupled to the main water channel 418 such that water passing through the water conditioner 400 passes through, or in fluid contact with, one or more injector nozzles or other outputs of the injection pump 416. The injection pump 416 may include a single pump mechanism and a set of electronically actuated valves that may be reconfigured by operation of buttons or user controls, or based upon control signals (e.g., from the processor 218 or another source). Once the valves are selectively configured, operation of the pump mechanism will cause additive from any cartridge corresponding to an open valve to be introduced into the water stream within the water channel 418. The water conditioner 400 also includes a pre-treatment module 412, which may include one or more filters of the filtration module 216. In some implementations, the pre-treatment module 412 may also include a turbine positioned along the main water channel 418 that operates by the flow of water through the main water channel 418, and that generates an electrical charge to power components of the water conditioner 400 or provide charge to the power source 208.

Figure 7A:
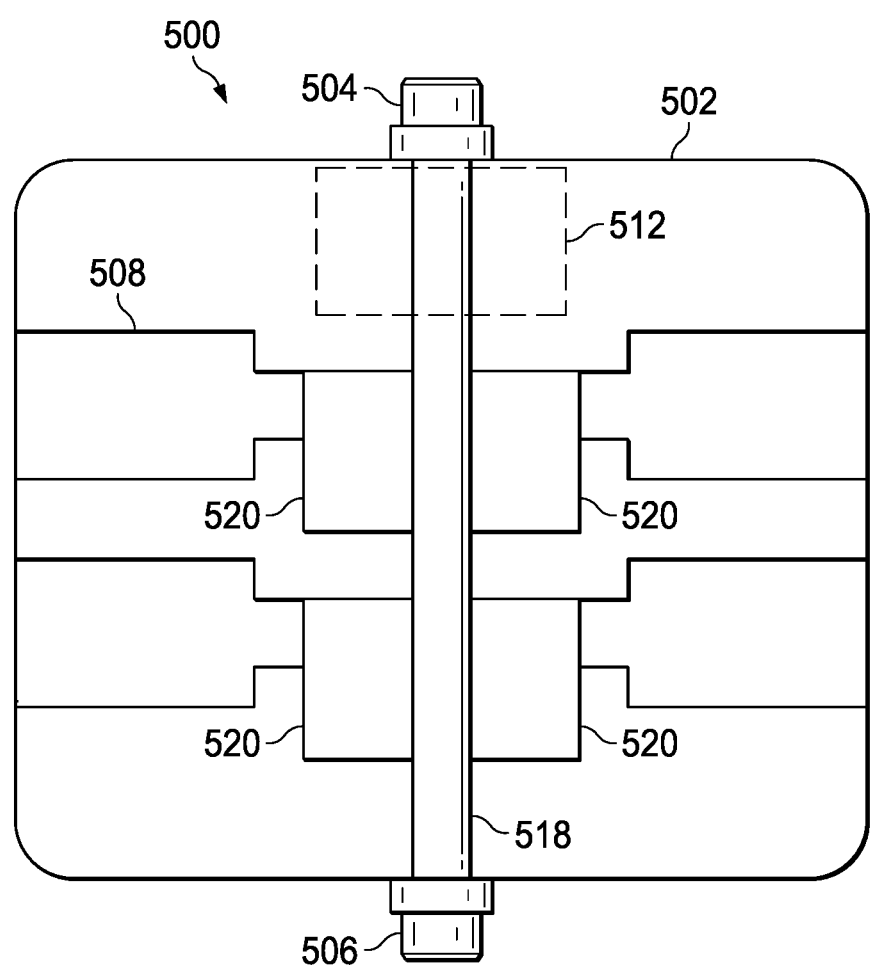
FIG. 7A is a schematic diagram of another exemplary interior configuration of a point of use water conditioner.

FIG. 7A is a schematic diagram of another interior configuration of a point of use water conditioner 500. The water conditioner 500 includes a case 502, water input 504, water output 506, cartridge receivers 508, pre-treatment module 512, and main water channel 518 having features and functions similar to those described above in the context of FIG. 6. The water conditioner 500 includes a set of four injection pumps 520, with each injection pump corresponding to a single cartridge receiver 508. The injections pumps 520 may be selectively operated (e.g., by the press of a corresponding button, or based upon control signals from the processor 218 or another device) to inject an additive into the main water channel 518 via an injection nozzle or other output that is in fluid contact with the main water channel 518.

Figure 7B:
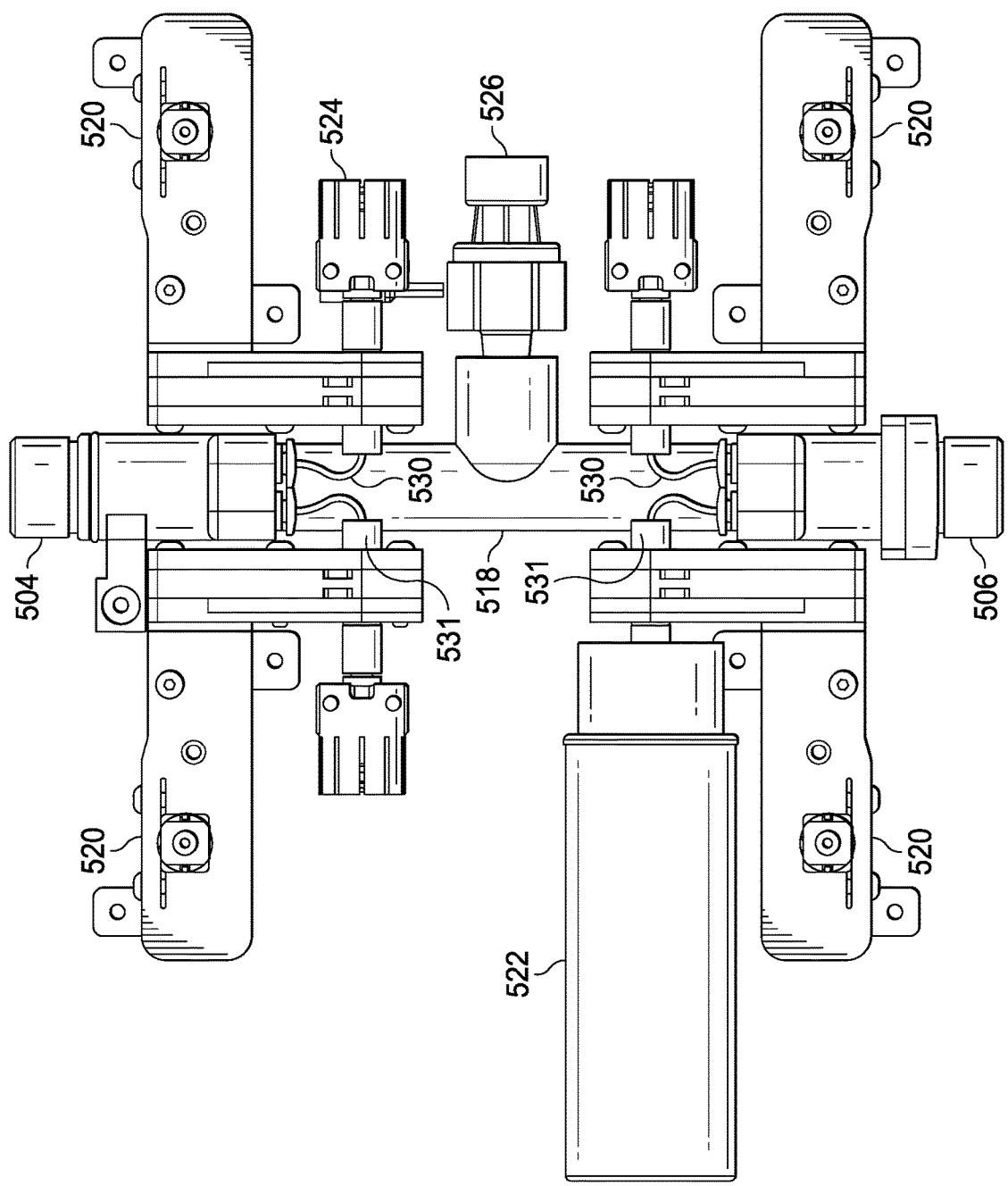
FIG. 7B is a front elevation view of exemplary internal components of the point of use water conditioner of FIG. 7A.

FIG. 7B is a front elevation view of a set of internal components such as may be used in the water conditioner 500. A water input 504 provides a flow of water to a main water channel 518 which terminates at a water output 506. A set of four injection pumps 520 are shown as a rack and pinion style pump mechanism that pulls an additive from a cartridge 522 on an input side, and then pushes the additive into the main water channel 518 through an output side, via a supply line 531 that is coupled to an injection nozzle 530, which itself is shown with more clarity in FIG. 7C. While the structural portions of the cartridge receivers are not shown in FIG. 7C, the functional portion of each cartridge receiver is shown as a cartridge coupling 524 that is positioned to engage with a nozzle or valve of the cartridge 522 when it is inserted into a cartridge receiver.

A secondary water channel 526 is also shown, branching from the main water channel 518. The secondary water channel 526 terminates within the case 502 of the water conditioner 500, and may be accessible via a removable back-plate or side plate of the case 502. The secondary water channel 518 may be used in place of the water input 504, which itself may be plugged or otherwise closed. This may be useful where the water conditioner 500 is positioned over top of the water input, as it minimizes the amount of externally visible piping or tubing to that which is coupled to the water output 506. Alternatively, the secondary water channel 526 may be coupled to a secondary device, such as discussed in the context of FIG. 3, in order to provide selective water output from the secondary water channel 526, the water output 506, or both simultaneously, as has been described.

Figure 7C:
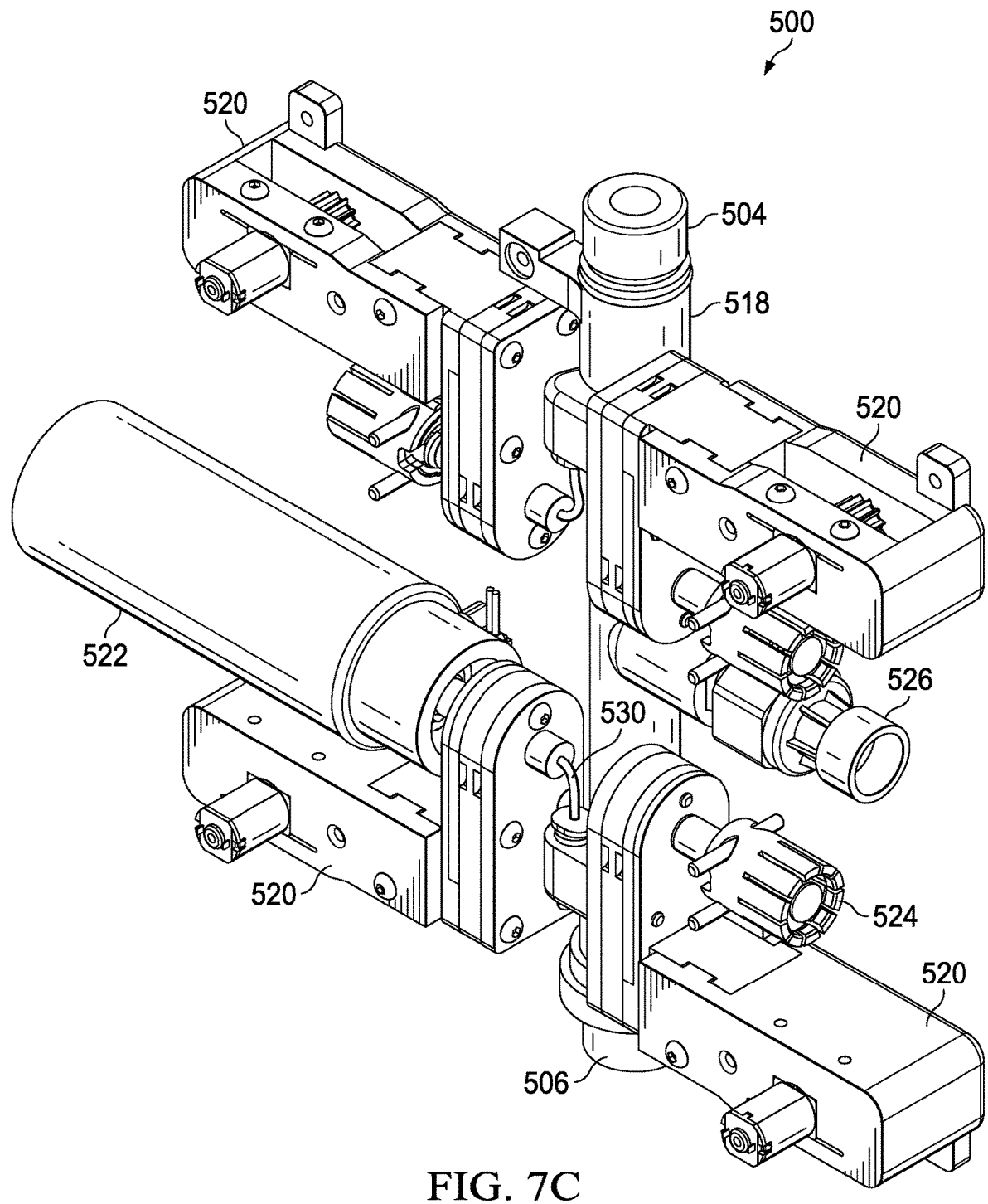
FIG. 7C is a front perspective view of the internal components of FIG. 7B.

FIG. 7C is a front perspective view of the internal components shown in FIG. 7B. The cartridge couplings 524 are shown in more detail, and may include features to create an impermeable seal between the cartridge coupling 524 and the cartridge 522, as well as features to "activate" the cartridge upon coupling (e.g., a push tab or other structure that engages with and depresses a locking mechanism of the cartridge 522 as it is inserted. An injection nozzle 530 is also visible, extended from the main water channel 518, and coupled to the injection pump 520 via a supply line on the output side of the injection pump 520.

Figure 8:
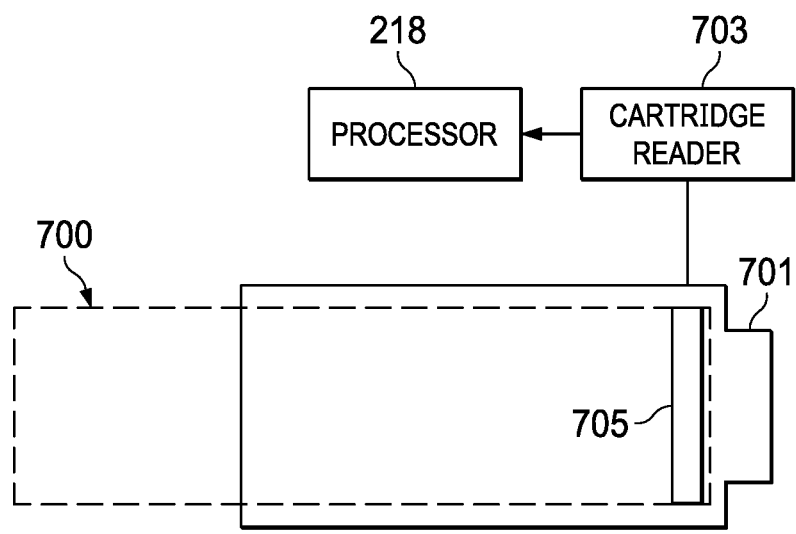
FIG. 8 is a schematic diagram of an exemplary cartridge receiver.

FIG. 8 is a schematic diagram of a cartridge receiver such as may be included in a cartridge based water conditioner. The position of a body of a cartridge 700 within the cartridge receiver 701 is illustrated in dashed lines. As has been described, a cartridge 700 may be inserted into the cartridge receiver 701, and may be guided into fluid communication with an injection pump via a cartridge coupling. In some implementations, the cartridge receiver 700 may include a cartridge reader 703 that is positioned on or near the cartridge coupling, near the terminal point of the cartridge receiver 700 for example, such that it comes into physical contact with, or is otherwise positioned proximal to, a portion of the cartridge 700. For example, the cartridge 700 may include an identifier 705 that includes stored or encoded data describing characteristics of the cartridge. The identifier 705 may be, for example, a barcode, QR code, or other visually encoded data, an RFID chip or wireless memory, or a solid state memory chip. Data stored or encoded by the identifier 705 may include, for example, a unique identifier associated with each cartridge 700 (e.g., a record stored in a database may uniquely identify the cartridge 700 with this number as a primary key), a cartridge type or model, the contents or additive within the cartridge, or other information (e.g., such information may be actually stored or encoded in the identifier 705, or may be resolved by a database query using the unique identifier of the cartridge).

When inserted, the identifier 705 may be automatically read by the cartridge reader 703, with the received information being provided to the processor 218 (or another device or processor) for use by the water conditioner. Such use may include, for example, verifying compatibility of the cartridge, verifying usability of the cartridge, verifying the contents or additive within a cartridge, verifying that the cartridge has not expired or exceeded its usable life, or other uses. Such uses may be performed entirely locally to the water conditioner (e.g., based upon locally available and stored data), or may be performed over a network, such as by receiving information from, or providing information to, one or more remote servers that store data related to verifying the cartridge.

As one example, in some implementations each cartridge 700 may be associated with a unique identifier stored on its identifier 705, and a remote server 106 may store records relating to each unique identifier. When the cartridge 700 is first coupled to the water conditioner, the unique identifier is read from the identifier 705 and provided to the remote server 106 (e.g., via a device such as the water use hub 102, or a user device 108 such as a smartphone, which may be in communication with the water conditioner). The remote server 106 may confirm that the unique identifier is associated with a previously manufactured cartridge, and may check for recalls or safety notices relating to the cartridge, and where no issue exists may provide information back to the water conditioner indicating that the cartridge is usable. Upon receiving this information, the water conditioner may allow the cartridge to be used for water modification, as has been described. When the same cartridge is exhausted and removed from the water conditioner, a similar process may result in additional data being provided to the remote server 106 indicating that the cartridge is exhausted. If the same cartridge were re-inserted to the water conditioner, the remote server 106 may detect that the cartridge is exhausted and unusable, and may provide response data that causes the water conditioner to signal an error message and/or prevent the cartridge from being further extracted from for additives. The example above may be combined with additional systems and methods to allow for recertification, recycling, refilling, or other reuse of the cartridge, while ensuring that cartridges are not refilled with dangerous additives or chemistry, or refilled in a way that might damage the cartridge, the water conditioner, or both during subsequent use.

Figure 9A:
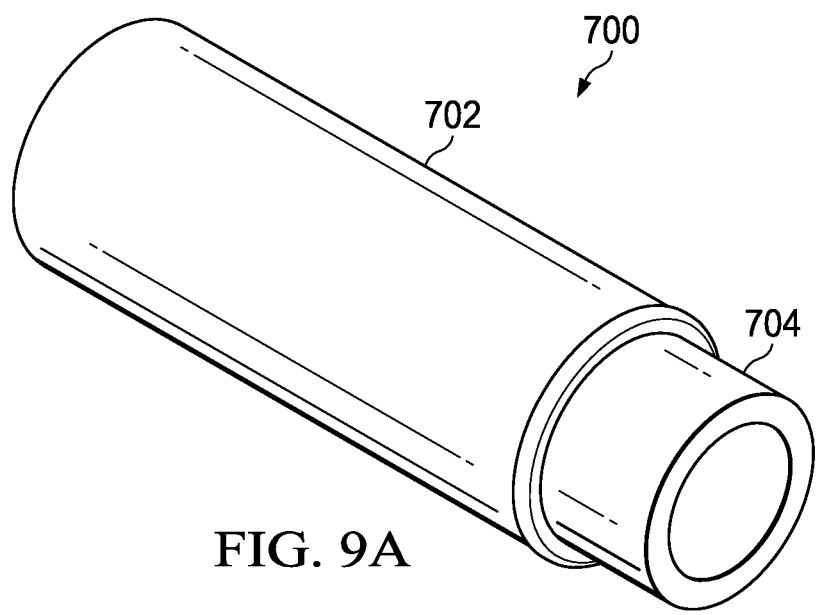
FIG. 9A is a front perspective view of an exemplary cartridge usable with a point of use water conditioner.

FIG. 9A is a front perspective view of a cartridge 700 that may be coupled with a water conditioner via a cartridge receiver to provide swappable and replaceable supplies of additives for water modification. The cartridge 700 includes a cartridge case 702 that may be shaped to fit the cartridge receiver, and a rim 704 that engages with a cartridge coupling (e.g., the cartridge coupling 524, as shown in FIG. 7C).

Figure 9B:
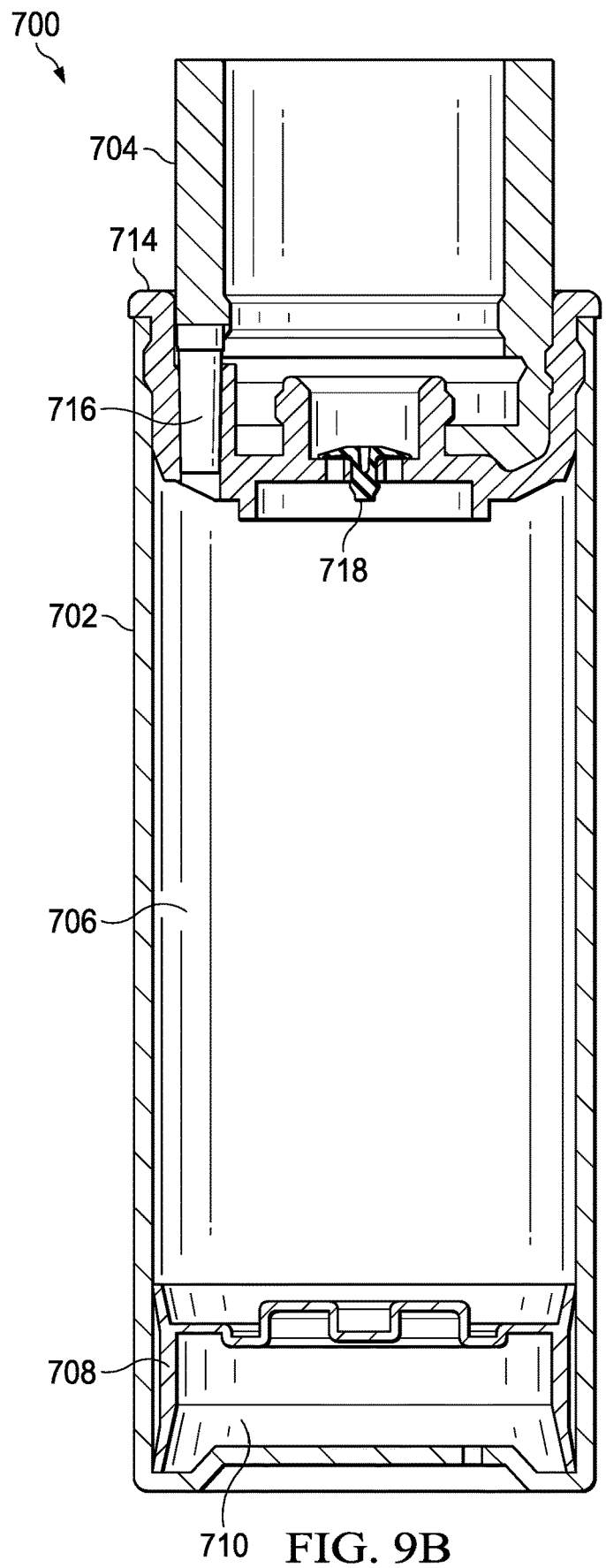
FIG. 9B is a cross sectional view of the cartridge of FIG. 9A.

FIG. 9B is a cross sectional view of the cartridge 700. A reservoir 706 is visible as a cavity within the cartridge case 702. A baseplate 708 that fits the diameter of the reservoir 706, sealing against the interior sidewalls, is positioned at the bottom of the reservoir 706 when the reservoir is filled with an additive substance. A sealed area 710 beneath the baseplate 708 may be filled with a pressurized gas or may include a spring or other biasing mechanism that provides a passive force against the baseplate 708, biasing the additive substance towards dispensing from the reservoir 706. A cap 714 seals an open end of the cartridge case 702, and the rim 704 is positioned within the interior of the cap. The cap 714 includes an output valve 718 that may be, for example, a membrane made of semi rigid rubber or another material that prevents the contents of the reservoir 706 from exiting in its default state, but that allows a supply shaft (e.g., a supply shaft 816 shown in FIG. 11B as part of an injection pump 800) to pass through and into the reservoir 706 when the cartridge 700 is coupled to the water conditioner. The cap 714 also includes a plug 716 that may be removed during filling or emptying of the cartridge 700. The identifier 705, discussed in FIG. 8, may be embedded within the cap 714, printed on an internal sidewall of the rim 704, or otherwise positioned within the proximal portion of the cartridge 700 depending upon the type of identifier.

Figure 10:
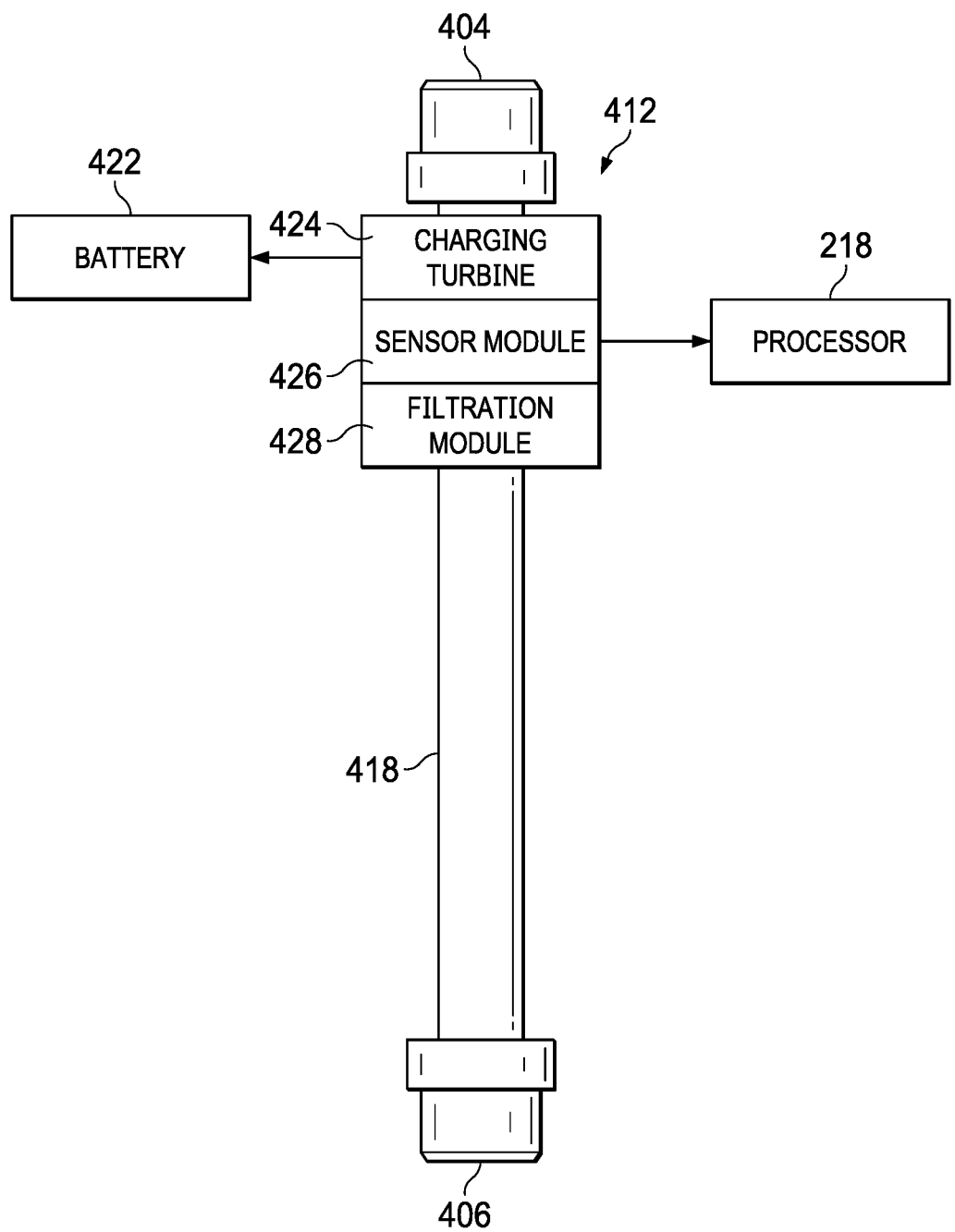
FIG. 10 is a schematic diagram illustrating an exemplary pre-treatment module usable with a point of user water conditioner.

FIG. 10 is a schematic diagram of a pre-treatment module 412 usable with a point of user water conditioner. The pre-treatment module includes a charging turbine 424, sensor module 426, and filtration module 428. The charging turbine 424 may be configured to produce an electrical charge to charge a connected battery 422 that powers the water conditioner, or may power the water conditioner directly. The sensor module 426 may include one or more sensors (e.g., flow sensor, pressure sensor, temperature sensor, etc.) in fluid contact with water traveling through the main water channel 418, and may be configured to provide measurement data to the processor 218. As an example, the sensor module 426 may include a flow sensor that determines whether or not water is flowing through the main water input, and provides such information to the processor 218 so that operation of the injections pumps and other devices may be disabled when no water flow is detected, and enabled when water flow is detected. The filtration module 428 may include one or more porous filters, filter membranes, filter substances, or other filtering components.

Figure 11A:
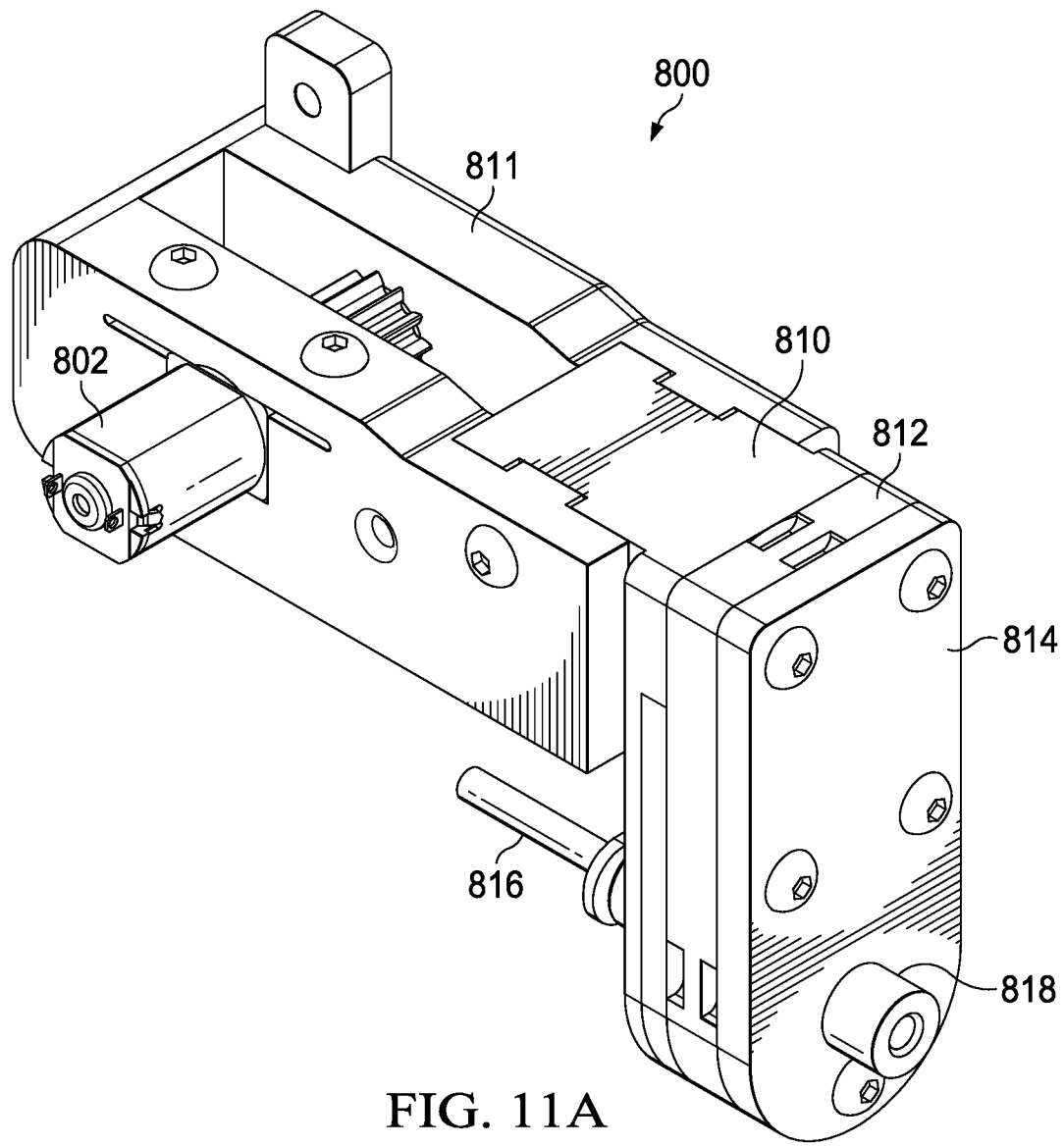
FIG. 11A is a front perspective view of an exemplary pump usable with a point of use water conditioner.

FIG. 11A is a front perspective view of an injection pump 800 that may be used with a point of use water conditioner (e.g., such as the injection pumps 520 of FIGS. 7B and 7C). The injection pump 800 includes an electric motor 802, seated within a housing 811, that is operable to extract an additive from a coupled cartridge, and inject that additive into a water flow in the main water channel of a water conditioner (e.g., the water conditioner 500). Pumping force is provided by the displacement of a volume within a cylinder plate 810 to which the housing 811 is coupled. During operation, an additive may be extracted from a cartridge that is coupled to the injection pump 800 by a supply shaft 816 that is inserted through a valve or opening of the cartridge.

Figure 11B:
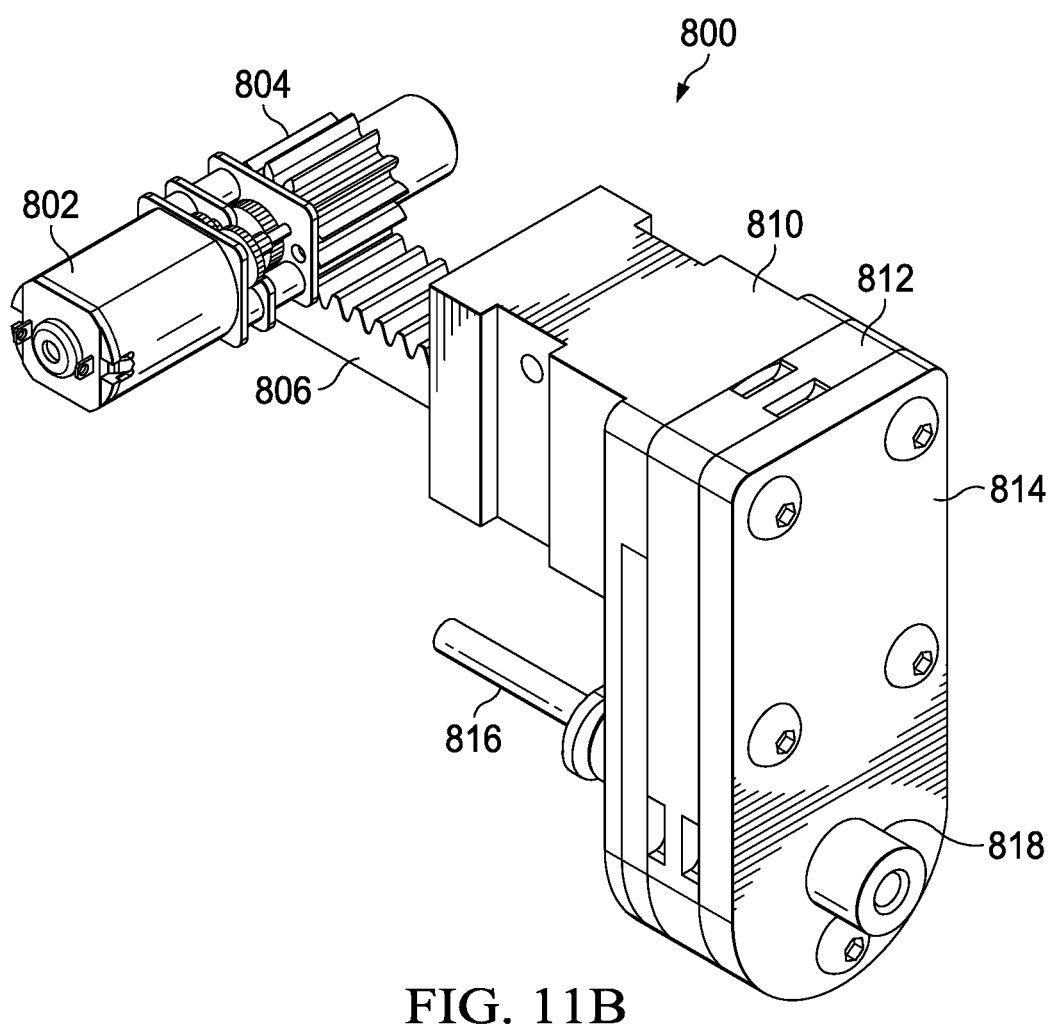
FIG. 11B is a front perspective view of the pump of FIG. 11A with a housing removed to show internal components.
Figure 11C:
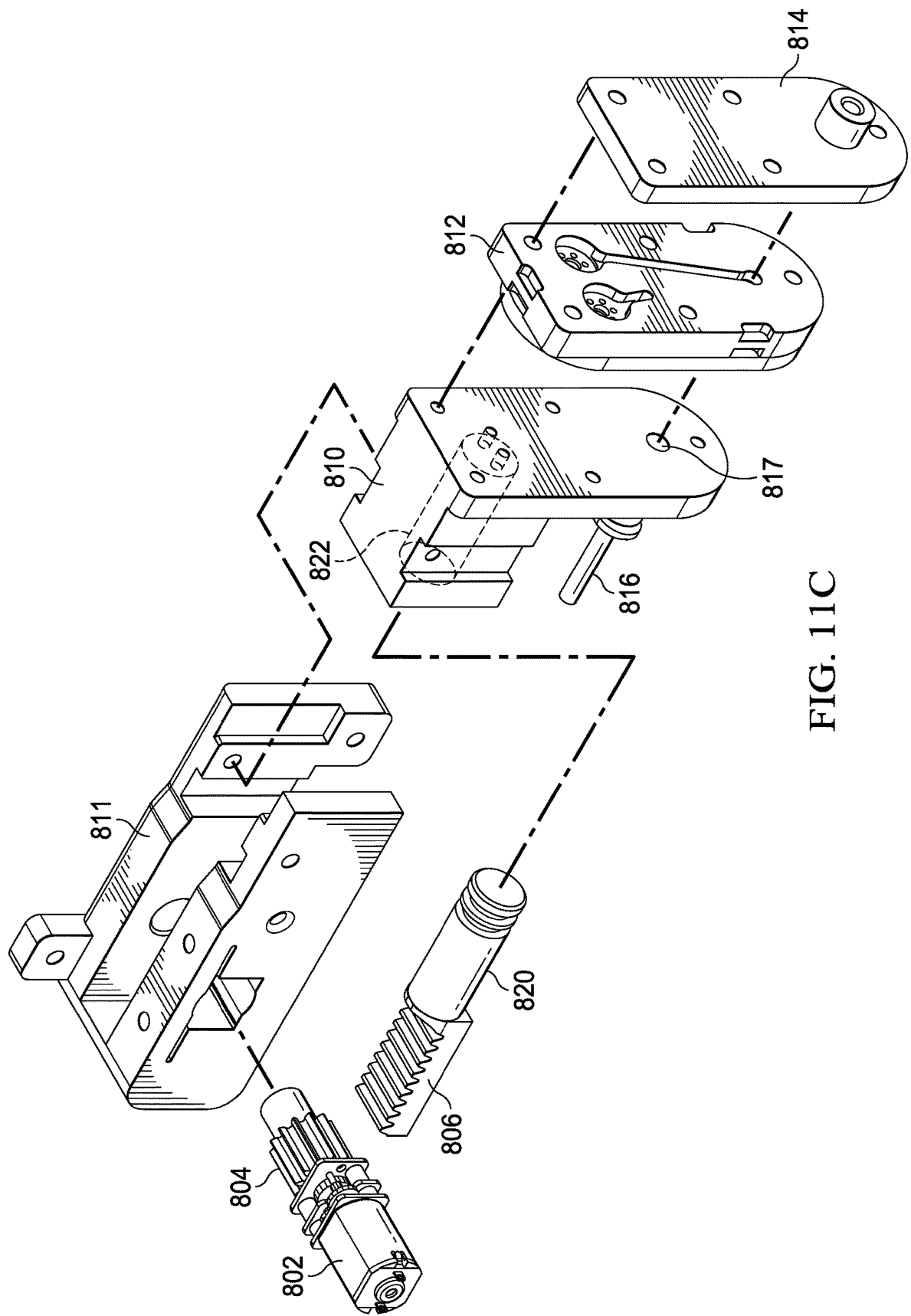
FIG. 11C is an exploded view of the pump of FIG. 11A.
Figure 11D:
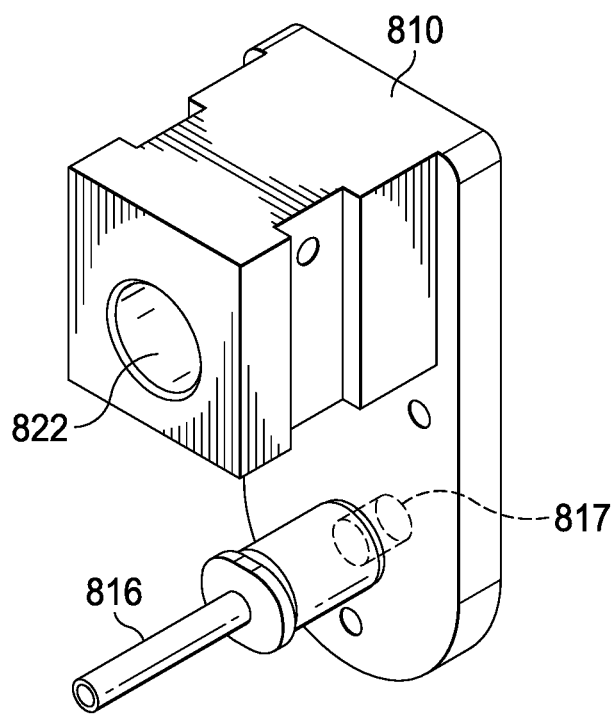
FIG. 11D is a rear perspective view of an exemplary cylinder plate of the pump of FIG. 11A.
Figure 11E:
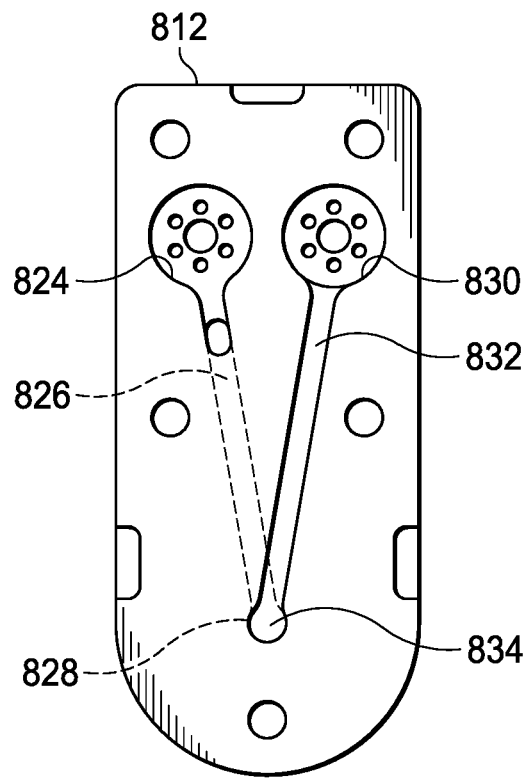
FIG. 11E is a front elevation view of an exemplary manifold plate of the pump of FIG. 11A, with dashed lines illustrating the position of an interior channel.

With reference to FIGS. 11D and 11E, the extracted additive is pulled into a cylinder 822 of the cylinder plate 810 via a manifold plate 812, and then pushed from the cylinder 822, through another channel of the manifold plate 812, to an output 818 of a cover plate 814. Each of the cylinder plate 810, manifold plate 812, and cover plate 814 are shown in the exploded view of FIG. 11C. In particular, an output 817 of the cylinder plate 810 can be seen in that figure, which aligns with an input 828 of the manifold plate 812 when assembled, which can be seen in FIG. 11E. FIG. 11E shows two channels of the manifold plate 812. An input channel includes an input 828 on the rear of the manifold plate 812, which aligns with the output 817 of the cylinder plate 810, an embedded channel 826 that is within the manifold plate 812 and fluidly connects the input 828 to a cylinder opening 824, and the cylinder opening 824 which fluidly connects to the cylinder 822 of the cylinder plate 810. An output channel of the manifold plate 812 includes a cylinder opening 830 which fluidly connects to the cylinder 822, a surface channel 832 which is visible on the surface of the manifold plate and fluidly connects the cylinder opening 830 to an output 834 that aligns with the output 818 of the cover plate 814. While the surface channel 832 is visible on the surface of the manifold plate 812, it is sealed by the cover plate 814 when the injection pump 800 is fully assembled.

Turning now to the source of displacement for the injection pump 800, FIG. 11B shows a front perspective view of the injection pump 800 with the housing 811 removed. The electric motor 802 can be seen coupled to a pinion 804, which itself is in rotational communication with a rack 806, which is slidably positioned within the housing 811 when assembled. Operation of the electric motor 802 in a first rotational direction causes the rack 806 to move in a first direction (e.g., along the x-axis), while operation of the electric motor 802 in a second rotational direction causes the rack 806 to move in a second direction opposite the first direction. With reference to FIG. 11C, the rack 806 can be seen as part of a single piece that also includes a piston 820, which collectively may be referred to as a piston shaft. The piston 820 is sized and shaped to occupy the cylinder 822, shown in FIG. 11D, such that as the piston 820 extends into the cylinder 822, or retracts from the cylinder 822, the volume of the cylinder 822 is displaced resulting in a positive or negative pressure (e.g., when extending into the cylinder 822 the contents of the cylinder will be pushed out, and when retracting from within the cylinder 822 a vacuum will be created within the cylinder 822). In this manner, operation of the electric motor 802 provides for a two stage operation of the injection pump 800, a first stage where the rack 806 withdraws the piston 820 from the cylinder 822, and a second stage where the rack 806 extends the piston 820 into the cylinder 820. Considered in light of the input channel and output channel defined by the manifold plate 812, it can be seen that the first stage causes an additive to be pulled from the cartridge into the cylinder via the input channel, while a second stage causes the additive within the cylinder to be displaced through the output channel and out of the cover plate 814.

Figure 12:
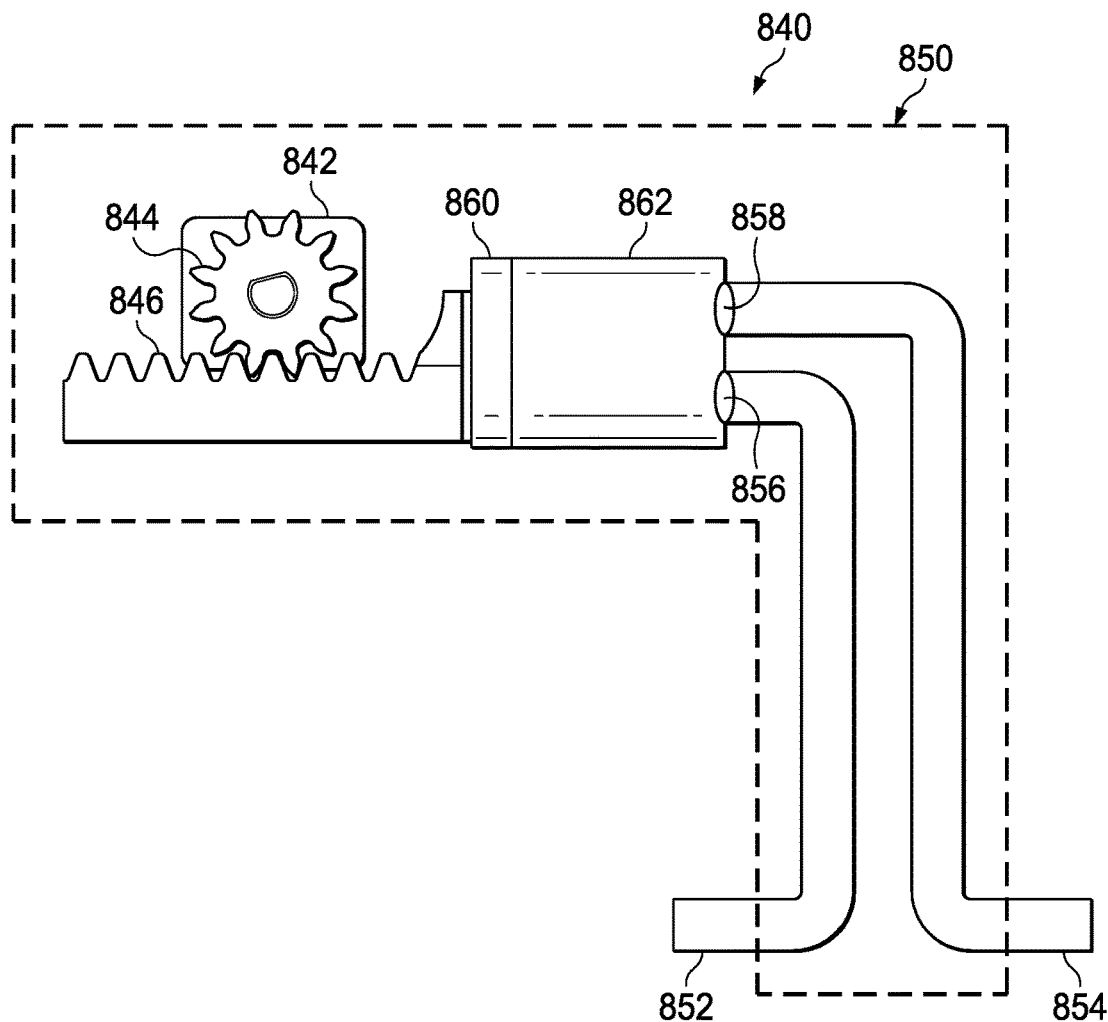
FIG. 12 is a schematic diagram illustrating another exemplary pump.

FIG. 12 further illustrates the operation of the injection pump 800 in schematic diagram form. An injection pump 840 includes an electric motor 842 coupled to a pinion 844, which itself is in rotatable communication with a rack 846 that includes a piston 860. The piston occupies the diameter of a cylinder 862, such that movement of the piston 844 along the x-axis may displace the volume of the cylinder 862, or create a vacuum within the cylinder 862. An input channel 852 and output channel 854 are illustrated in a similar configuration to that of the injection pump 800. Each channel 852, 854 also includes a unidirectional valve that allows for flow in a different direction, which determines the direction of flow during operation of the injection pump 840. For example, an input valve 856 allows for unidirectional flow into the cylinder 862, while an output valve 858 allows for unidirectional flow out of the cylinder 862. The valves 856, 858 may be flexibly biased (e.g., by a spring or other tension member) towards a closed position, such that they are closed in an equal pressure state. Any positive pressure in their allowed direction will exceed the strength of the biasing member and cause the valve to open, while pressure in the disallowed direction will instead pull the valve 856, 858 against the structure to which it is mounted and prevent flow. The valves 856, 858 may be implemented in other ways than that described above, such as electronically actuated valves that can open in either direction based upon a control signal, which may allow for additive present in a cylinder of the injection pump to be transported back to the cartridge, for example.

One advantage of the disclosed rack and pinion injection pumps is the precise control over the volume of additive that is injected into the primary water channel, as well as the high injection pressure which can be achieved (e.g., greater than the pressure of the fresh water input 12 or, if the water conditioner includes any flow or pressure restrictors, greater than the restricted flow) in order to inject the additive into the primary water channel without any backflow of water into the injection pump. To illustrate with reference to FIG. 12, the size of the teeth used for the rack 846 and pinion 844 may be selected to correspond to a displacement volume (e.g., 0.1 ml), and the electric motor 842 may be configured to operate in steps (e.g., full rotations, quarter rotations, etc.) that correspond to the displacement volume, such that instead of receiving a control signal that causes the electric motor 842 to be "on" or "off", a control signal is received that causes the electric motor 842 to operate for five quarter rotations or steps (e.g., which might correspond to 0.5 ml). High pressure of the displacement, to exceed the pressure of water flow in the primary water channel, may be achieved by selecting a size of the rack 844 and pinion 846 assembly that allows for sufficient force to be created while not exceeding the capabilities of the electric motor 842 (e.g., the diameter of the pinion 844 may be increased to increase the magnitude of force applied to the pinion 846).

Figure 13:
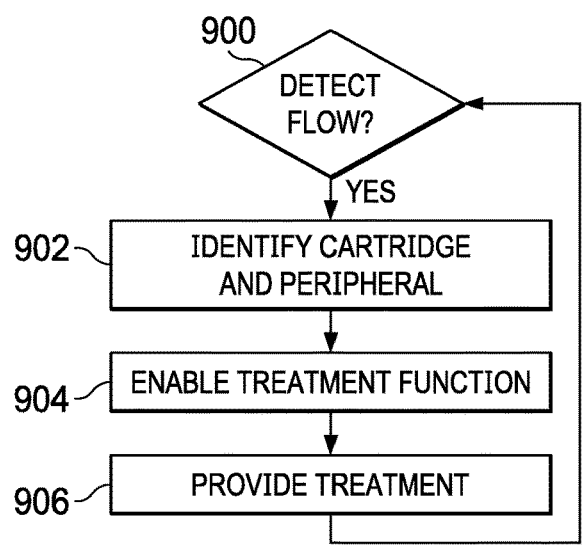
FIG. 13 is a flowchart of an exemplary set of high level steps that may be performed to operate a point of use water conditioner.

FIG. 13 is a flowchart of a set of high level steps that may be performed to operate a point of use water conditioner, such as may be used with the water conditioners disclosed herein. The water conditioner may be enabled for operation only when flow is detected 900, such as by a flow sensor or other sensor in a sensor module of the water conditioner. This may prevent injection of additives into a water channel that has resting/standing water within, or that is empty. Prior to or during use, the water conditioner may identify 902 any attached cartridges and/or peripherals in order to determine what sort of water modifications or other water uses may be provided. When usable cartridges and/or peripherals are coupled to the water conditioner and flow is detected 900, they may be enabled 904 for water modification or other use. The water conditioner may then provide 906 treatments for the water using the enabled cartridges and/or peripherals in response to user inputs, configured user preferences, or other inputs.

Figure 14:
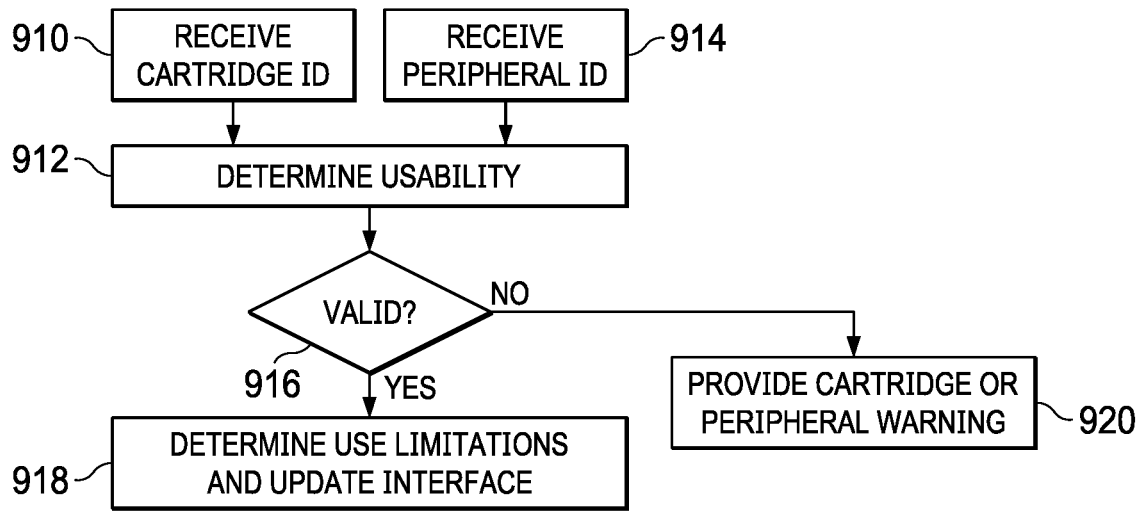
FIG. 14 is a flowchart of an exemplary set of steps that may be performed to enable use of a cartridge with a point of use water conditioner.

FIG. 14 is a flowchart of a set of steps that may be performed to enable use of a cartridge with a point of use water conditioner. While the discussion of FIGS. 13-17 may describe certain steps as being performed by or with the water conditioner (e.g., using the processor 218), it should be understood that in some implementations some or all of the steps may be performed by or with other processors, such as a processor of a user device 108, a remote server 106, a water use hub 102, or other devices. The water conditioner may receive 910 an identifier or other cartridge information when a cartridge is coupled to the water conditioner, when the system detects flow 900, or both. Information may be received from the cartridge as has been described, which may include reading a unique identifier from an RFID chip located on the cartridge using a wireless RFID reader. The water conditioner may determine 912 the usability of the cartridge based upon the identifier or other information, which may be performed locally, or in conjunction with a remote server 106. As an example, a local determination may include decoding an encoded value with a locally stored key, while a remote determination may include exchanging information with the remote server 106 to verify the authenticity and/or prior use of the cartridge to determine if it is usable.

Where the cartridge is valid 916, the water conditioner may determine one or more use limitations associated with the cartridge and update a user interface to reflect these limitations. As an example, some cartridges containing chemical treatments may only allow one use per day or other time interval, may only allow one use per shower or other usage based occurrence, or may only allow uses for certain configured users of the water conditioner (e.g., a treatment may be enabled based upon a wireless connection with a proximately located mobile device associated with a particular user, and disabled when the device is not proximately located). Other cartridges, such as user experience cartridges (e.g., color, carbonation, scent) may allow unlimited uses, or generally less restrictive uses. A user interface of the water conditioner may be updated to reflect any present limitations. This may include, for example, illuminating a light indicator associated with a button for a particular cartridge in a different color to indicate it is limited to one use per day, or to indicate that no further use is possible at that time. As another example, this may include updating a software interface on a user device 108 to describe or otherwise illustrate such limitations. Where the cartridge is invalid 916, the water conditioner may instead provide 920 a warning indicating that the cartridge is invalid or defective, and will prevent injection of additives from that cartridge into the water stream. Providing 920 such warnings may include audible warnings, illumination of light indicators associated with the cartridge, or notification via a user device 108 indicating the error.

Where a peripheral is connected to the water conditioner, a peripheral identifier may be received 914 that identifies the peripheral and its capabilities. The peripheral identifier may be received via a wireless or wired transmission of data from the peripheral upon connection, as has been described, or may be configured or provided via a user device 108. The water conditioner may determine 912 the peripherals usability locally or in conjunction with a remote server 106, as has been described in the context of cartridges, and where the peripheral is valid 916 the water conditioner may determine 918 any limitations on its use and update a user interface to reflect such limitations. As an example, where the attached peripheral is identified as a toothbrush that selectively provides water during use, the water conditioner may determine 918 that certain cartridges may now be injected into the water stream during use of that peripheral, such as scents, colors, or chemical treatments that would negatively impact brushing of teeth. Where the attached peripheral is invalid or unusable 916, the water conditioner may provide a warning via a user interface indicating the error, and prevent the flow of water to the peripheral device.

Figure 15:
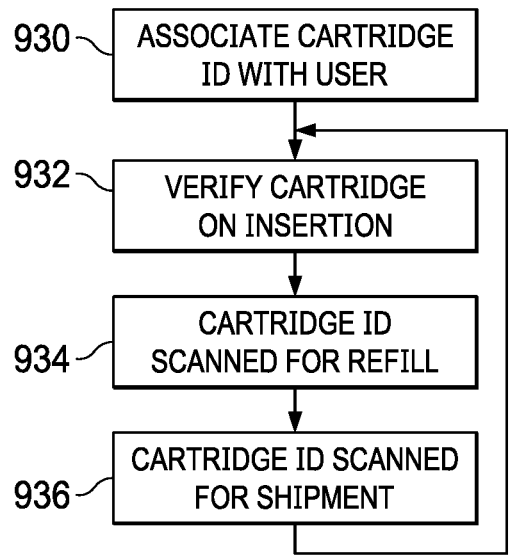
FIG. 15 is a flowchart of an exemplary set of steps that may be performed to manage reuse of cartridges.

FIG. 15 is a flowchart of an exemplary set of steps that may be performed to manage reuse of cartridges. As has been described, a particular cartridge that is usable with a water conditioner may include unique identifying data (e.g., stored by the identifier 705) that is usable to verify the contents, use history, compatibility, and other characteristics of the cartridge. This identifying data may also be used to aid in recycling, refilling, and reconditioning of cartridges. This may be particularly advantageous for the disclosed cartridges since they will be used during showering, handwashing, or other hygiene related tasks, and so users may show a preference for having a dedicated set of cartridges through refilling and reconditioning processes, as opposed to receiving a refilled or reconditioned cartridge of unknown history, ownership, or use. In other words, a user may wish to purchase a cartridge new, exhaust its additive during use, return the cartridge to be refilled, and then receive the very same cartridge back once refilled.

This may be accomplished by associating 930 each cartridges unique identifying data with a user, with such association being stored locally (e.g., on a water conditioner, or by a user device 108), on a remote server 106, or both. This association may be made when a cartridge is first purchased by a user, using a software application on a user device 108, for example. Each time a cartridge is inserted in or otherwise coupled to a water conditioner, the identifying data may be read from the identifier 705 and verified 932 to confirm that it has been previously associated with the user 930, and may provide a warning if the cartridge has not been associated with the user, or has been associated with another user. Once the cartridge is exhausted, the user may provide the cartridge to a location that is capable of refilling or reconditioning the cartridge (e.g., by mail shipment, placing in a recycling bin or drop area, or otherwise). At that location, the cartridge identifier 705 may again be scanned 934 to verify the user and any user preferences related to the refill (e.g., a user may have particular configured preferences related to an additive's formulation or contents), or to identify a user account or payment preferences to which refill charges may be applied, or both. The cartridge identifier 705 may be scanned 936 again during shipment to identify the user's shipping information and any configured user preferences related to shipment, or to automatically print and prepare shipping labels and other packaging related to shipping, or both. Once shipped back to the user, the user will know that they have received their same cartridge when the water conditioner verifies 932 the cartridge upon insertion, or will know that they have received a different cartridge when the water conditioner reports that the cartridge is new or unfamiliar.

Figure 16:
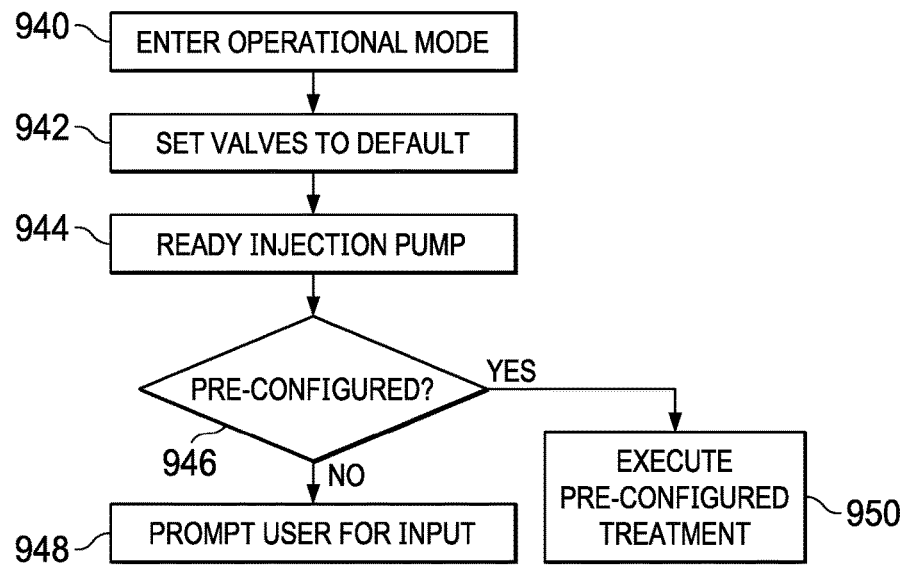
FIG. 16 is a flowchart of an exemplary set of steps that may be performed to provide point of use water treatment.

FIG. 16 is a flowchart of a set of steps that may be performed to provide point of use water treatment. When one or more treatment functions are enabled, the water conditioner may enter 940 an operational mode, which may include waking from a lower power consumption sleep state and preparing to receive user inputs and/or provide water modifications. In a low power state, most of the power consuming components of the water conditioner may be disabled, while components involved in waking from the lower power state such as the processor 218, communication device 212, and one or more sensors of the sensor module 214 may be operating normally or at a reduced power level. The water conditioner may enter 940 the operational mode based on a schedule (e.g., as determined by a time clock of the processor 218), based on communication with a user device 108 via the communication device 212, or based upon output of one or more sensors (e.g., motion or proximity sensor indicating a user nearby, a water flow sensor indicating flow of water into the water conditioner via an input).

During operation 940, the water conditioner may set 942 one or more valves to an initial or default setting, in implementations that include electronically actuated valves. As an example, with reference to FIG. 6 this may include closing each valve of the injection pump 416, or with reference to FIG. 7B this may include closing or opening a valve of the secondary water channel 526 (e.g., depending upon whether a peripheral is connected, or the secondary water channel 526 is used in place of the water input 504). The water conditioner may also ready 944 one or more injection pumps to prepare for additive injection into a water stream in the primary water channel. As an example, with reference to FIG. 6, this may include clearing the injection pump 416 and any output supply lines from any additive present from prior uses, such as by operating the injection pump 416 to reverse additive back into its origin cartridge, or into a waste or dump outlet. As another example, with reference to the injection pumps of FIGS. 11A through 11E and FIG. 12, this may include priming each injection pump by filling the cylinder 822, 862 with additive so that it is ready to quickly inject into the water stream.

The water conditioner may also determine 946 whether there are any pre-configured water modification actions, which may be configured by users of the water conditioner to automatically execute during use of water at the point of use. For example, a water conditioner installed at a shower 112 may be configured to provide a scent additive at the start of a shower, a carbonation additive four minutes after the shower begins, and then a color additive eight minutes after the shower begins (e.g., which a user might find useful to signal various stages of a shower or the passage of time during the shower). Where there are pre-configured routines 946, the water conditioner may execute 950 any pre-configured treatments. The water conditioner may also prompt 948 users for manual input (e.g., via an interface such as a set of light indicators and buttons, or otherwise) to trigger water modifications, which may occur instead of or in addition to any pre-configured treatments 950.

Figure 17:
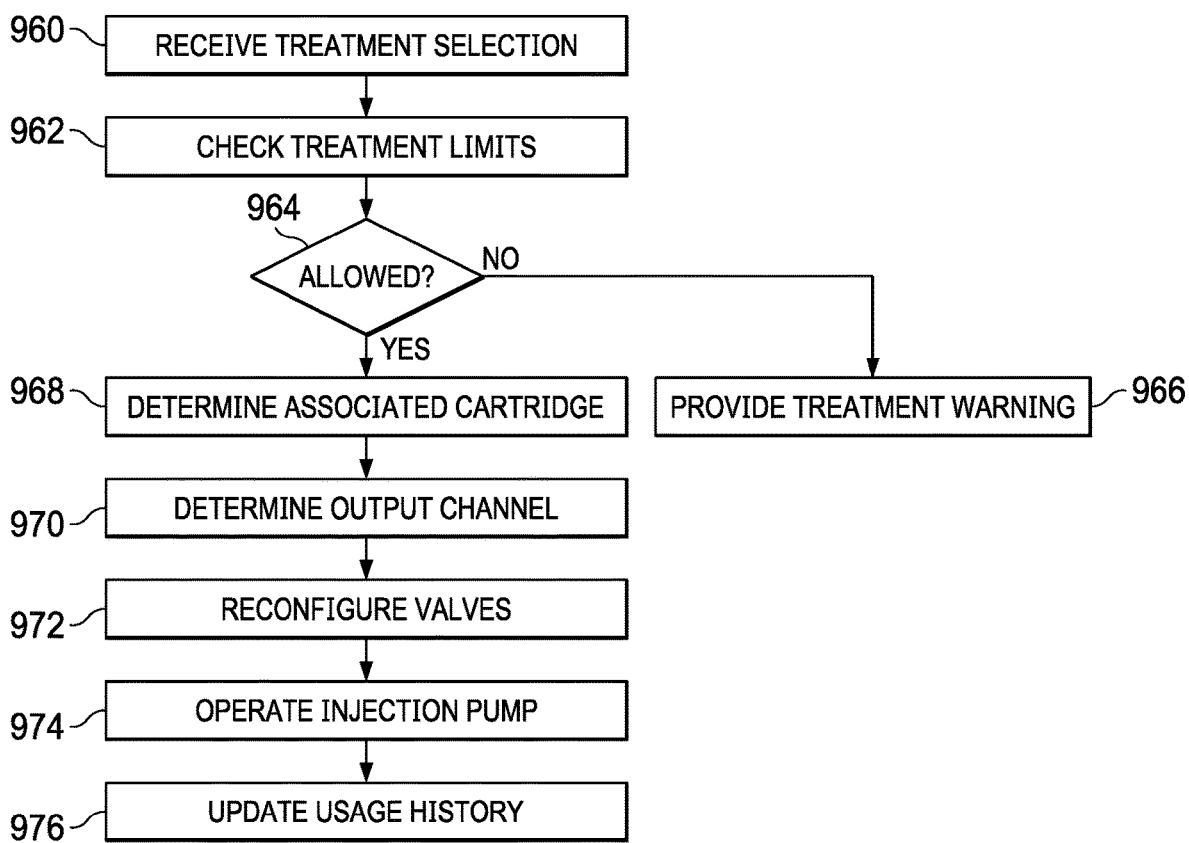
FIG. 17 is a flowchart of another exemplary set of steps that may be performed to provide point of use water treatment.

FIG. 17 is a flowchart of another set of steps that may be performed to provide point of use water modification. When the water conditioner receives 960 a treatment selection, either based upon a pre-configured automatic routine, or a manual input, the water conditioner may check 962 one or more treatment limits related to the selections. Treatment limits may be configured on a per-cartridge basis, and may be configured by a manufacturer of the cartridge, or by a user. As an example, some additives that provide a chemical treatment rather than a user experience modification may be limited for health or safety reasons. As another example, a user of the system may configure a limitation on experience related modifications in order to control costs of operation of the system. Limitations may be enforced over a period of time (e.g., 30 minutes), and may be per-use (e.g., per button press to inject the additive), per-volume (e.g., total amount of additive injected), per-user (e.g., some users may have limitations, while others do not), and in other ways.

Where a selected use is not allowed 964 due to being outside some treatment limit, the water conditioner may provide 966 a treatment warning indicating that a selected use is outside allowed limits (e.g., flashing of light indicators, audible warning, etc.). Where a use is allowed 964 and within treatment limits, the water conditioner may determine 968 one or more cartridges associated with the selection. Depending upon a particular implementation, the associated cartridge may be determined 968 by a correspondence with an input (e.g., with reference to FIG. 5, each of a set of buttons 312 may correspond to a single cartridge), or may be a stored configuration accessible by the processor 218. The water conditioner may also determine 970 an output channel for the additive, which may depend upon the particular cartridge, whether the water conditioner has a secondary water channel and/or attached peripheral device, or whether the water conditioner has multiple other water inputs or water outputs.

The water conditioner may also reconfigure 972 one or more valves based upon the selection. Implementations such as that shown in FIG. 7A may not include any electrically actuated valves and so would not require per-treatment reconfiguration. Other implementations, such as that shown in FIG. 6, or implementations that allow for attachment of peripheral devices, may include one or more electrically actuated valves that may need to be configured to a certain state during each additive treatment. As an example, in an implementation including an attached peripheral device such as a spray handle, the injection of a color additive may modify water flowing to the primary shower head and the spray handle, or may be excluded from one water stream or the other. In such implementations, a valve may be automatically actuated as the color additive is injected into the water stream in order to confine the water modification to the water stream flowing to the primary shower head, for example.

Once the water conditioner is configured for injecting the selected water modification, one or more injection pumps may be operated 974 to introduce additives into the water stream. Injection of additives may be gradual, or may be instantaneous. As an example, with reference to an injection pump such as that shown in FIG. 11A, the electric motor 802 may be operated in small steps or increments over a period of time (e.g., between about 5 seconds and about 60 seconds) to gradually introduce additive, or may be operated to provide a larger dose over a shorter period of time (e.g., a full cylinder 822 of additive in between about 1 second and about 5 seconds). The characteristics of a particular injection pump may be determined and configured for the water conditioner such that the processor 218 is able to readily convert each treatment selection to the operation of the injection pump. As an example, where a particular injection pump is configured to operate in steps that displace a 0.1 ml volume, the processor 218 may be configured to convert each ml of selected additive into 10 steps for that pumps electric motor. Such information may be statically configured, or may be configured from time-to-time based upon the output of a flow sensor, to accommodate varying mechanical tolerances and/or changes in operation over time. At each use, the water conditioner may also update 976 a set of use history information that is stored locally or on the remote server 106. Use history may include such information as number of uses of each cartridge, volume extracted from each cartridge, and more general/aggregated analytics information about usage patterns across multiple users and water conditioners. Use data may be used to provide warnings to users when cartridges are nearly exhausted, or may be used to automatically initiate cartridge recycling, reconditioning, or reordering activities.

Figure 18A:
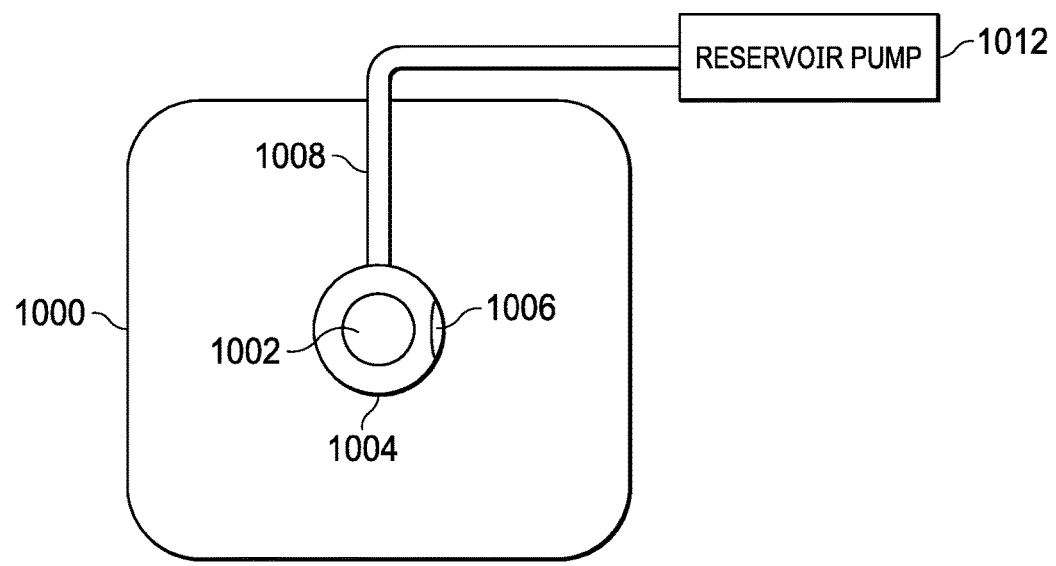
FIG. 18A is a schematic diagram of an exemplary water capture ring.
Figure 18B:
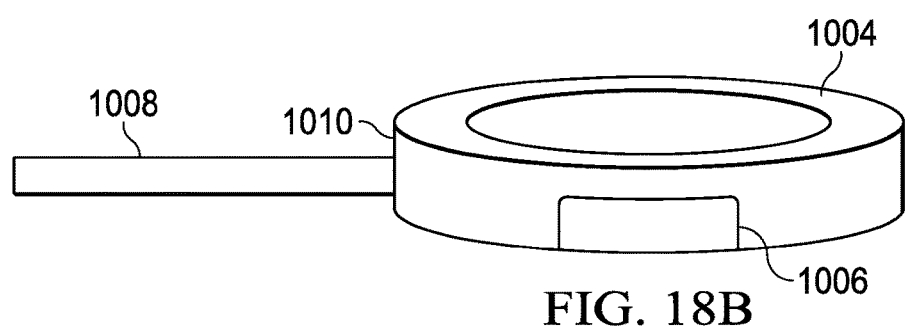
FIG. 18B is a front perspective view of the water capture ring of FIG. 18A.
Figure 18C:
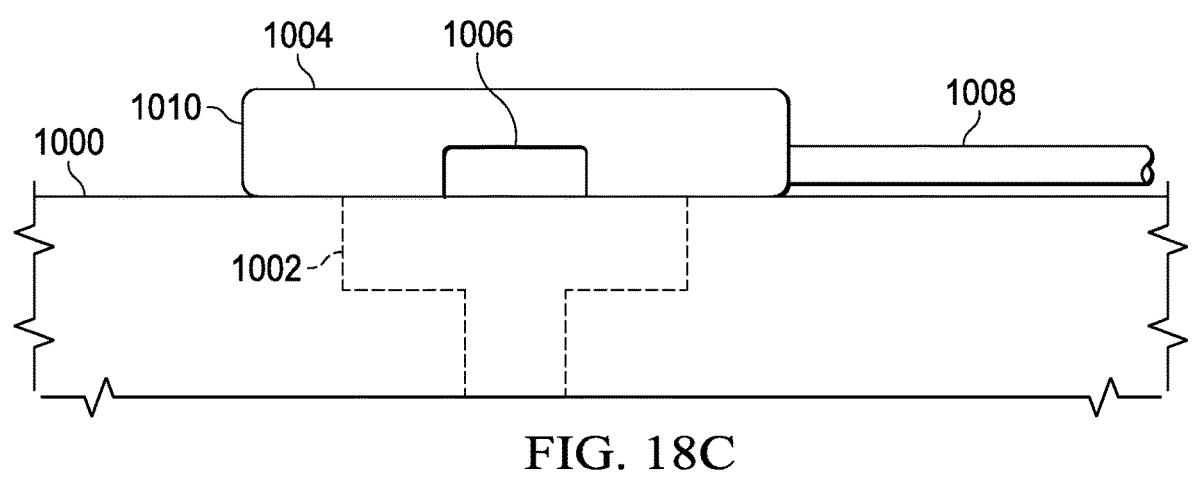
FIG. 18C is another schematic diagram of the water capture ring of FIG. 18A.

As has been described in the context of FIG. 3, some implementations of the water conditioner 200 may include a storage reservoir 222 and water transport device 224 operable to capture water at a point of use, such as prior to entering a drain, so that it can be stored and treated for subsequent use. FIG. 18A provides an example of a water capture device in the form of a drain ring 1004 that may be installed at a point of use in order to capture water as it is used, prior to entering the primary infrastructure 11 or after entering the primary infrastructure but prior to being expelled to the water waste output. Water captured by the drain ring 1004 may be diverted to the storage reservoir 222 via modular infrastructure 13, as has been described. A shower pan 1000 may be positioned to receive water from a shower 112, with such water coming from the fresh water input 12 or a point of use water conditioner. The shower pan 1000 includes a drain 1002 by which water from the shower 112 will enter the primary infrastructure 11 if not captured. The drain ring 1004 is placed around the drain 1002, and includes a raised edge (e.g., see a raised edge 1010 in FIG. 18B) so that water within the shower pan 1000 will gather up to a certain depth before spilling over the drain ring 1004 and into the primary infrastructure 11. The drain ring 1004 includes an inlet 1006 on a lower exterior of the raised edge 1010 which pooling water may enter into a hollow cavity within the drain ring 1004. An outlet channel 1008 couples the drain ring 1004 to a reservoir pump 1012 (e.g., such as the water transport 224 of the water conditioner 200), such that water entering the inlet 1006 may be transported from the shower pan 1000 to a storage reservoir (e.g., such as the storage reservoir 222) for storage, treatment, and subsequent use. As can be seen in FIG. 18B, the height of the raised edge 1010 may be selected to allow for pooling water to reach a depth where the inlet 1006 is at least partially submerged, while preventing water from pooling to a depth that is uncomfortable and/or unsafe. FIG. 18C shows a side elevation of the drain ring 1004, with the drain 1002 illustrated as a set of dashed lines below the surface of the shower pan 1000.

Water capture devices may be implemented in varying ways other than as the ring 1004, and may be implemented for other points of use besides the shower pan 1000. For example, a water capture device may be implemented as a plug that is inserted into the drain in a shower or sink, or may be implemented as an inline capture device on a drain hose of a washing machine.

A single room may have one or more point of use devices 104 with varying functions. As an example, a master bathroom may have a first point of use water conditioner (e.g., such as the water conditioner 500) installed at a shower 112 in order to modify water during bathing, a second point of use water conditioner (e.g., such as the water conditioner 200) installed at a sink in order to modify water during handwashing or dental hygiene, and a third point of use water conditioner capable of capturing, storing, treating, and re-using water (e.g., such as the water conditioner 200 including the storage reservoir 222 and water transport 224) positioned at or on a wall of the room. Water used at the sink 110 and shower 112 may be captured by the third point of use water conditioner, and may be provided for subsequent use to the toilet 118, or to the first and/or second point of use water conditioner.

Figure 19A:
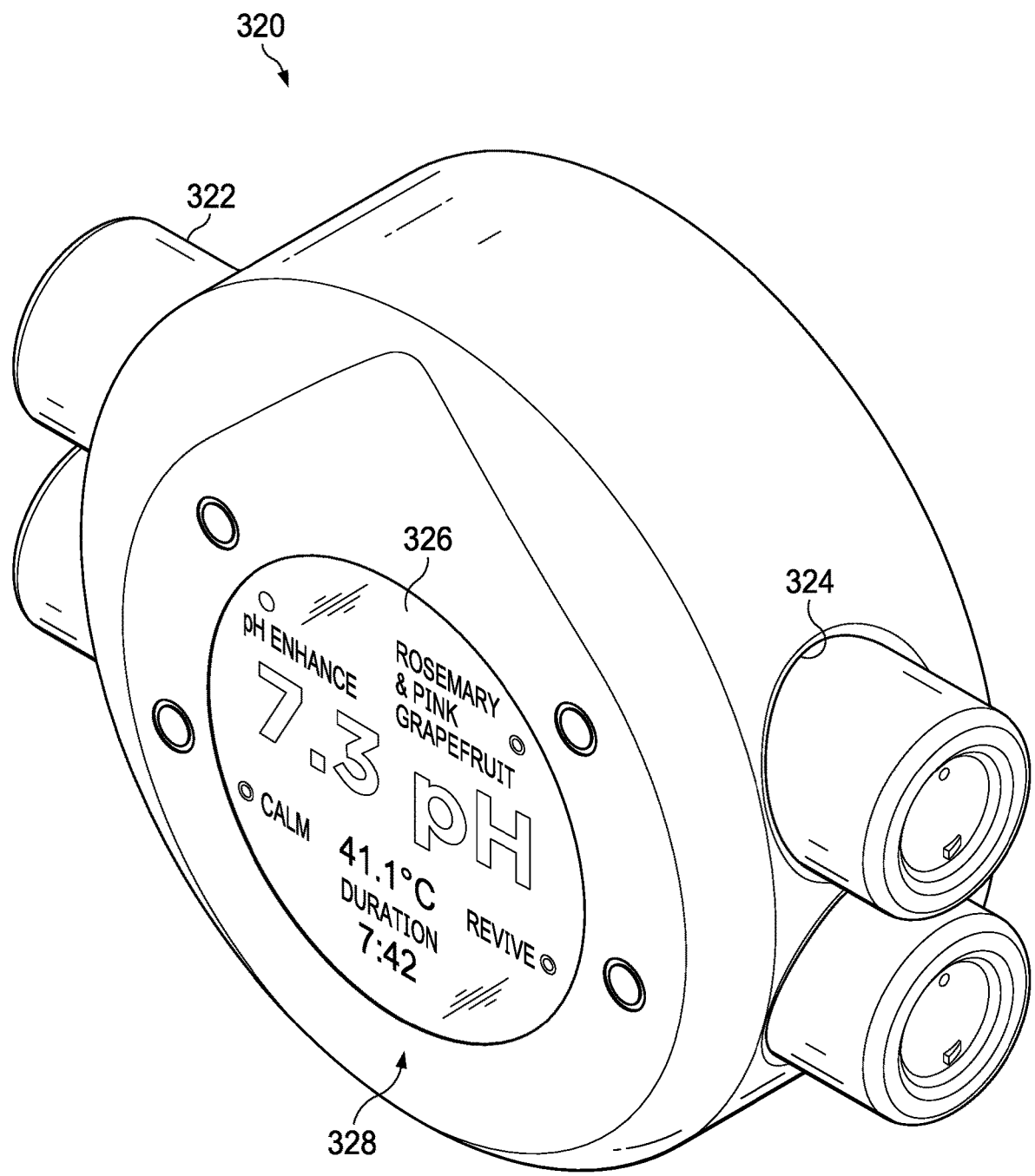
FIG. 19A a front perspective view of an alternate exemplary point of use water conditioner.

It should be understood that the point of use water conditioner 300 of FIG. 5 is an example only, and that various implementations of water conditioners 300 may have different shapes, sizes, numbers and positions of cartridges and cartridge receivers, and other characteristics. With reference to FIG. 19A, The water conditioner 320 may have the same or similar features as those shown in FIGS. 3-5, and the case is circular with the cartridge receivers 324 inset upon the curved edge of the case, and configured to receive and couple with a cartridge 322, as has been described. A display 326 on the front of the water conditioner 320 may be an LCD, LED, or other display, and may be configured to display various operational characteristics of the water conditioner 300. The interface 328 shown rendered on the display 326 of FIG. 19A shows a current measured pH of the water, a duration of the current shower, which may count up to track total time, or may count down from a configured number, and a measured temperature of the water. The display 326 may provide visual alerts based on displayed characteristics, such as visually indicating by a color or symbol that the water is above or below a configured temperature threshold, or that the duration of a shower is exceeding a configured limit. Alerts may also be provided by audio tones projected by a speaker of the water conditioner 320. The interface 328 also displays information associated with a corresponding cartridge and button (e.g., "pH Enhance", "Rosemary & Pink Grapefruit", "Calm", and "Revive"), indicating to a user the effects of each button. Such information may be configured by a user upon installation of each cartridge 322, or may be determined automatically based upon information read from a cartridge identifier, as has been described.

Figure 19B:
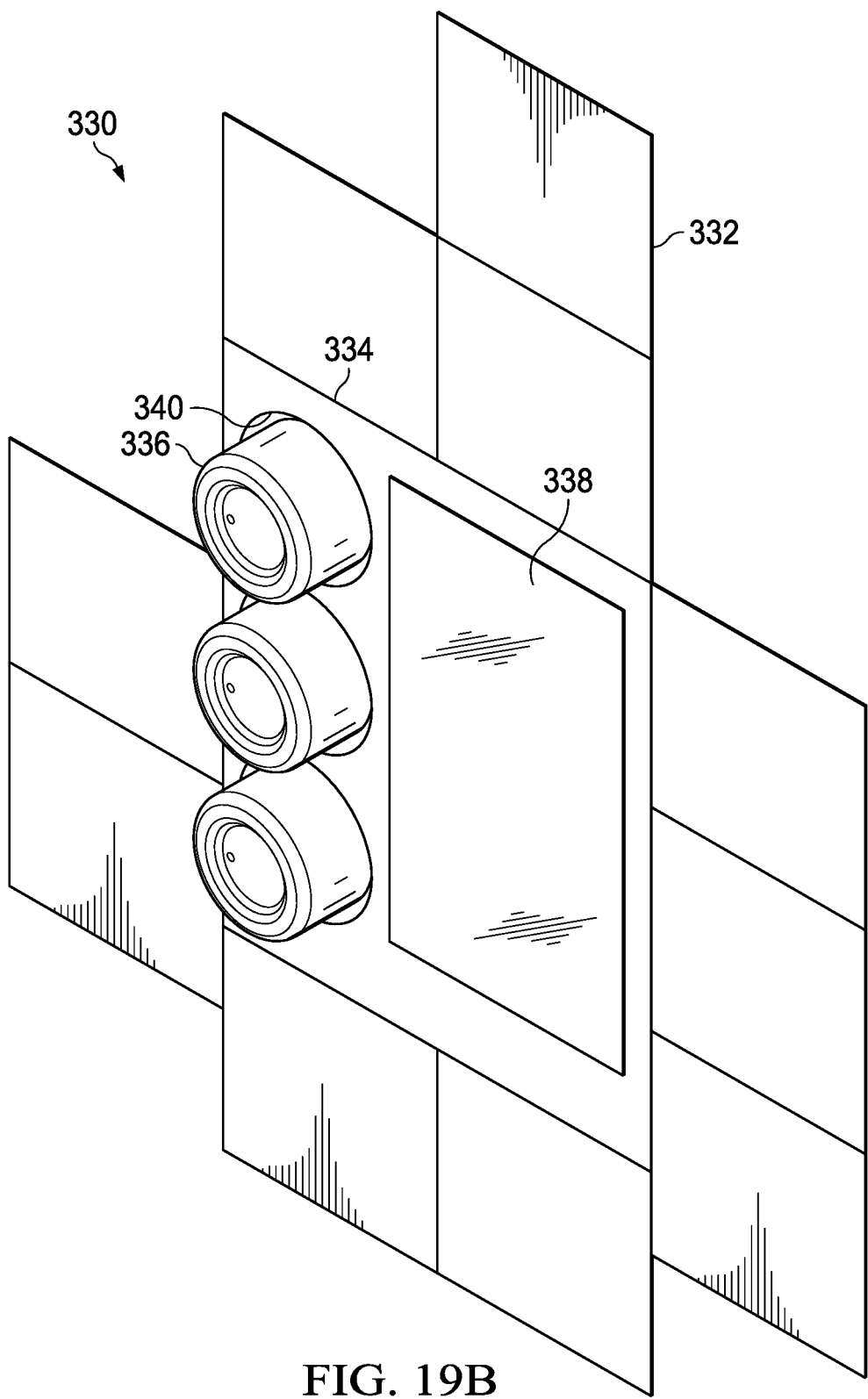
FIG. 19B a front perspective view of another alternate exemplary point of use water conditioner.

FIG. 19B shows another exemplary water conditioner 330 that may have the same or similar features as those shown in FIGS. 3-5, and that includes an inset case 334 that may be installed in a cavity within a tiled surround 332. Water connections may be within the case 334 and/or surrounding wall. The water conditioner 330 also includes cartridge receivers 340 that are configured to receive and couple with a cartridge 336, as has been described. A display 338 may be, for example, an LED or LCD display that is configured to provide various operational information, and may also have touch input capabilities for selecting treatments and interacting with the water conditioner 330.

Figure 19C:
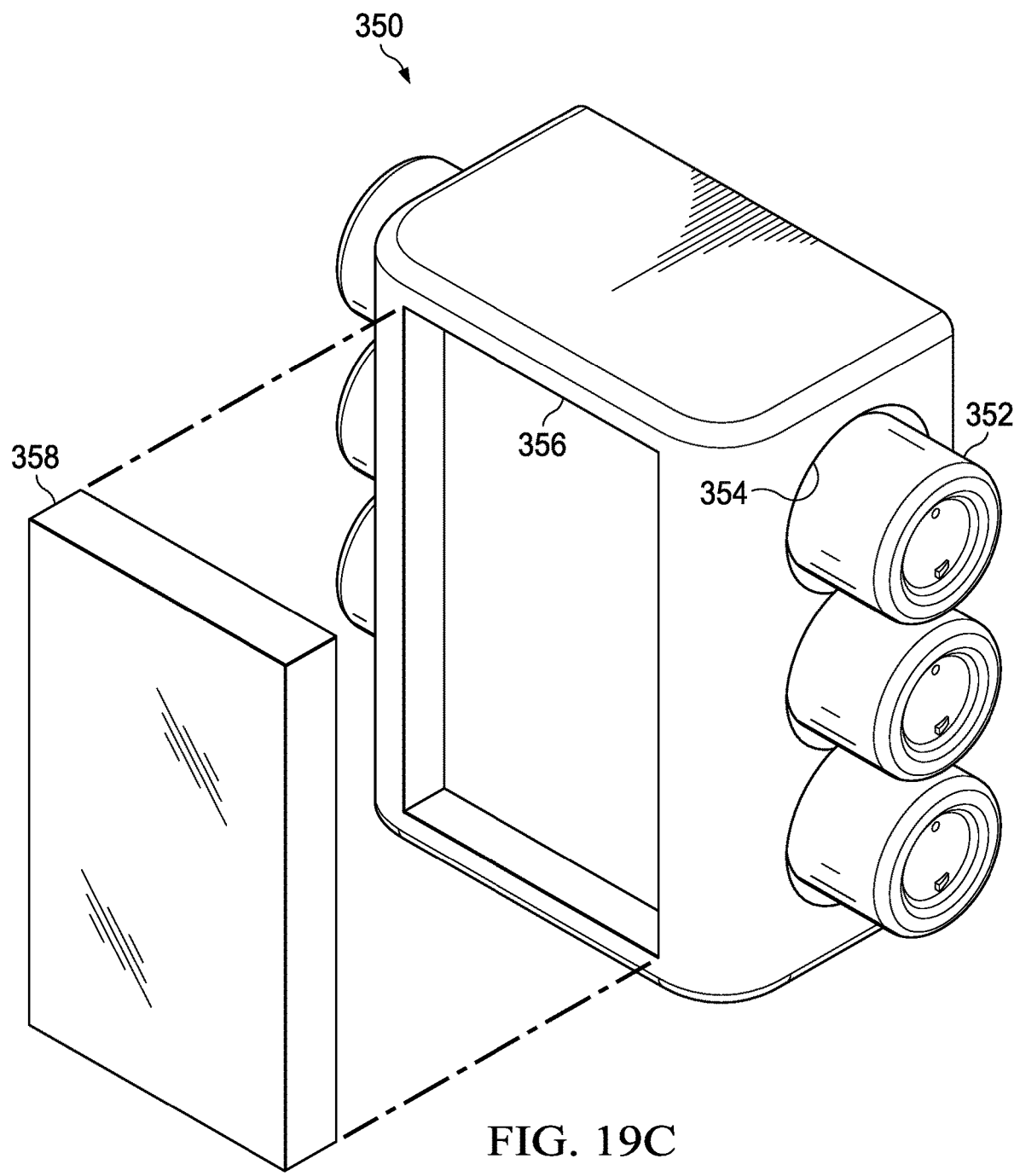
FIG. 19C a front perspective view of yet another alternate exemplary point of use water conditioner.

FIG. 19C shows another exemplary water conditioner 350 that may have the same or similar features as those shown in FIGS. 3-5, including a set of cartridge receivers 354 that are configured to receive and couple to a set of cartridges 352. The water conditioner 350 includes a slot 356 sized and configured to receive an interface device 358. The interface device 358 may be, for example, a smartphone, tablet, or proprietary mobile device that includes a display, a user interface, and other features similar to the user device 108. The interface device 358 may be communicatively coupled to the water conditioner 350 by insertion into the slot 356, or may be wirelessly coupled to the water conditioner 350 and placed in the slot for safe storage during a shower. When coupled to the water conditioner 350, the interface device 358 may display operational characteristics, receive user inputs to interact with and configure the water conditioner 350, and may provide user specific configurations (e.g., each user within a household may carry their personal configurations between water conditioners).

COMBINATIONS

Example 1

A residential water supplementation system comprising: (a) a case configured to be positioned at a point of use within a residence; (b) a water channel configured to receive a volume of water from a water source that is coupled to a water input of the water channel and provide the volume of water to a water output; (c) one or more cartridge receivers; (d) one or more injection nozzles in fluid communication with the water channel; (e) one or more pumps, wherein each pump: (i) is coupled to at least one of the one or more cartridge receivers; (ii) is coupled to an injection nozzle of the one or more injection nozzles; (iii) is operable to extract a volume of chemistry from a cartridge that is coupled to the at least one cartridge receiver and inject the volume of chemistry into the volume of water via the injection nozzle; and (f) a processor configured to cause the one or more pumps to modify the volume of water within the water channel based on a selected treatment.

Example 2

The system of example 1, further comprising a user interface operable by a user to provide the selected treatment.

Example 3

The system of example 2, wherein the user interface includes, for each of the one or more cartridge receivers, at least one button operable to provide the selected treatment from that cartridge receiver, and at least one visual indicator configured to provide information on that cartridge receiver.

Example 4

The system of any one or more of examples 1 through 3, further comprising: (a) a storage reservoir of the water channel that is configured to store water; (b) a transport pump operable to: (i) transport the volume of water from a precedent point of use to the storage reservoir; and (ii) transport the volume of water from the storage reservoir to the water output.

Example 5

The system of any one or more of examples 1 through 4, wherein each of the one or more cartridge receivers includes a cartridge reader that is configured to read a set of cartridge information from an identifier of a cartridge that is coupled to that cartridge receiver.

Example 6

The system of example 5, wherein the cartridge reader is a wireless signal transceiver configured to receive and provide the set of cartridge information to the processor.

Example 7

The system of any one or more of examples 5 through 6, wherein the processor is configured to provide the set of cartridge information to a remote server via a communication device.

Example 8

The system of any one or more of examples 5 through 7, wherein the processor is configured to determine whether the cartridge that is coupled to the cartridge receiver is usable based on the set of cartridge information and, when the cartridge that is coupled to the cartridge receiver is not usable, prevent the one or more pumps from extracting chemistry from the unusable cartridge.

Example 9

The system of any one or more of examples 5 through 8, wherein the case is configured to be positioned at a shower, and both the water input and the water output are configured to be coupled to pre-existing connectors of the shower.

Example 10

The system of any one or more of examples 1 through 9, wherein at least one pump of the one or more pumps includes: (a) a cylinder; (b) a motor operable to rotate a pinion; and (c) a piston shaft that includes a piston head at a distal end that is positioned within the cylinder, and a rack at a proximal end that is in contact with the pinion such that rotation of the pinion in a first rotation direction or a second rotation direction causes the piston head to displace a volume of the cylinder in a first direction and a second direction.

Example 11

The system of example 10, wherein the at least one pump further includes: (a) an input channel that is coupled to the at least one cartridge and to an input valve of the cylinder; and (b) an output channel that is coupled to the injection nozzle and to an output valve of the cylinder; wherein operation of the motor in the first rotation direction causes the cylinder to be filled from the at least one cartridge via the input channel, and operation of the motor in the second rotation direction causes the cylinder to be emptied via the output channel.

Example 12

The system of example 11, wherein the at least one pump is configured to operate in equal steps based upon control signals from the processor, and wherein the processor is configured to: (a) determine the volume of chemistry associated with the selected treatment; (b) determine a number of steps that corresponds to the volume of chemistry; and (c) operate the at least one pump based upon the determined number of steps.

Example 13

The system of any one or more of examples 11 through 12, wherein a diameter of the pinion is selected to provide a displacement pressure from the cylinder that exceeds a pressure within the water channel.

Example 14

The system of any one or more of examples 1 through 13, wherein the system is part of a modular infrastructure that is separate from a pre-existing primary infrastructure.

Example 15

The system of any one or more of examples 1 through 14, wherein the processor is a single processor within the case.

Example 16

The system of any one or more of examples 1 through 15, further comprising a communication device, wherein the processor comprises a first processor within the case, and a second processor within a user device that is in communication with the first processor via the communication device.

Example 17

The system of any one or more of examples 1 through 16, further comprising a sensor module that includes sensors capable of measuring the volume of water for one or more of: (a) water temperature; (b) mineral content; (c) acidity; (d) chemical content; (e) particulate content; (f) microbial content; (g) fungal content; (h) viral content; or (i) oxygen demand.

Example 18

The system of any one or more of examples 1 through 17, wherein the one or more pumps includes a single pump that is coupled to at least two of the one or more cartridge receivers.

Example 19

The system of any one or more of examples 1 through 18, wherein there is a one-to-one correspondence between the one or more pumps and the one or more cartridge receivers.

Example 20

The system of any one or more of examples 1 through 19, wherein the water output includes a primary water output and a secondary water output, and wherein the primary water output is coupled to a pre-existing point of use and the secondary water output is configured to couple to a peripheral device.

Example 21

The system of any one or more of examples 1 through 20, further comprising: (a) a power source that provides power to the processor and the one or more pumps; and (b) a turbine positioned within the water channel and configured to provide power to the power source while the volume of water is passing through the water channel.

Example 22

The system of any one or more of examples 1 through 21, further comprising a flow sensor positioned within the water channel and configured to indicate when the volume of water is passing through the water channel, wherein the processor is configured to operate in a low power mode or a normal power mode based upon the indication from the flow sensor.

Example 23

The system of any one or more of examples 1 through 22, further comprising a filtration module configured to filter the volume of water as it passes through the water channel and separate a set of contaminants from the volume of water.

Example 24

The system of example 23, wherein the filtration module includes a filter cartridge receiver configured to receive a filter cartridge that includes a filter for separating and retaining the set of contaminants.

Example 25

The system of any one or more of examples 1 through 24, wherein the processor is configured to: (a) receive a set of cartridge information from a cartridge reader of a cartridge receiver of the one or more cartridge receivers in response to a cartridge being coupled to the cartridge receiver; (b) identify a chemistry associated with the cartridge based on the set of cartridge information.

Example 26

The system of example 25, wherein the processor is configured to: (a) determine one or more use limitations associated with the chemistry based on the set of cartridge information and a configured set of use limitations; and (b) cause the one or more pumps to modify the volume of water based on the selected treatment and the one or more use limitations.

Example 27

The system of example 26, wherein the configured set of use limitations includes one or more of: (a) a limited number of chemistry injections over a duration of time; and (b) a limited volume of chemistry injections over the duration of time.

Example 28

The system of any one or more of examples 1 through 27, wherein the processor is configured to: (a) receive a set of cartridge information from a cartridge reader of a cartridge receiver of the one or more cartridge receivers in response to a cartridge being coupled to the cartridge receiver; (b) identify a cartridge identifier based on the set of cartridge information; (c) determine whether the cartridge has been previously coupled with any cartridge receiver of the one or more cartridge receivers based on the cartridge identifier and a configured set of paired cartridges; and (d) provide a warning to a user interface where the cartridge has not been previously coupled with any cartridge receiver of the one more cartridge receivers.

Example 29

The system of any one or more of examples 1 through 28, wherein the processor is configured to determine the selected treatment based upon a pre-configured treatment, and wherein the pre-configured treatment includes two or more discrete chemistry injection events to be performed by the one or more pumps based upon a duration of time since the volume of water began flowing through the water channel.

Example 30

The system of any one or more of examples 1 through 29, further comprising a communication device, wherein the processor is in communication with one or all of a water use hub, a user device, and a remote server via the communication device.

Example 31

A residential point of use reservoir device comprising: (a) a water capture device in fluid communication with a precedent use water, wherein the water capture device includes a sensor configured to provide a signal that indicates the presence of the precedent use water; (b) a storage reservoir configured to hold a volume of water; (c) a first channel that provides a fluid connection between the water capture device and the storage reservoir; (d) one or more cartridge receivers; (e) one or more injection nozzles in fluid communication with the storage reservoir; (e) one or more pumps, wherein each pump: (i) is coupled to at least one of the one or more cartridge receivers; (ii) is coupled to an injection nozzle of the one or more injection nozzles; and (iii) is operable to extract a volume of chemistry from a cartridge that is coupled to the at least one cartridge receiver and inject the volume of chemistry into the volume of water via the injection nozzle; (f) a second channel that provides a fluid connection between the storage reservoir and a subsequent point of use; (g) one or more transport pumps configured to: (i) transport the precedent use water to the storage reservoir based on the signal from the sensor; and (ii) transport water from the storage reservoir to the subsequent point of use.

Example 32

The device of example 31, wherein the water capture devices comprises a ring configured to fit around a drain at a precedent point of use, the ring including: (a) a raised edge that prevents the precedent use water from flowing into the drain when the precedent use water is below a depth corresponding to the height of the raised edge; (b) an inlet on an exterior sidewall that allows the precedent use water to enter a cavity within the ring; and (c) an outlet that couples the cavity within the ring to the first channel; wherein the sensor is positioned within the cavity of the ring and is configured to provide the signal when the precedent use water pools within the cavity of the ring.

Example 33

The device of any one or more of examples 31 through 32, wherein each of the one or more cartridge receivers comprises a structure having a shape configured to receive and align a cartridge valve of a cartridge with a supply shaft of a pump of the one or more pumps that corresponds to that cartridge receiver.

Example 34

The device of any one or more of examples 31 through 33, wherein at least one of the first channel and the second channel includes tubing.

Example 35

The device of example 34, wherein the tubing comprises a first tube usable to receive water from the ring, and a second tube usable to dispose of water via the ring.

Example 36

The device of any one or more of examples 31 through 35, wherein the one or more cartridge receivers includes at least two cartridge receivers, and wherein there is a one-to-one correspondence between the one or more cartridge receivers and the one or more pumps.

Example 37

The device of any one or more of examples 31 through 36, wherein at least one pump of the one or more pumps includes: (a) a cylinder; (b) a motor operable to rotate a pinion; and (c) a piston shaft that includes a piston head at a distal end that is positioned within the cylinder, and a rack at a proximal end that is in contact with the pinion such that rotation of the pinion in a first rotation direction or a second rotation direction causes the piston head to displace a volume of the cylinder in a first direction and or second direction.

Example 38

The system of example 37, wherein the at least one pump further includes: (a) an input channel that is coupled to the at least one cartridge and to an input valve of the cylinder; and (b) an output channel that is coupled to the injection nozzle and to an output valve of the cylinder; wherein operation of the motor in the first rotation direction causes the cylinder to be filled via the input channel, and operation of the motor in the second rotation direction causes the cylinder to be emptied via the output channel.

Example 39

The system of example 38, wherein the at least one pump is configured to operate in equal steps based upon control signals from a processor, and wherein the processor is configured to: (a) determine the volume of chemistry associated with the selected treatment; (b) determine a number of steps that corresponds to the volume of chemistry; and (c) operate the at least one pump based upon the determined number of steps.

Example 40

The device of any one or more of examples 31 through 39, wherein the filter is replaceable.

Example 41

A method for residential water supplementation comprising: (a) providing a water supplementation unit configured to receive a volume of water from a water source and provide the volume of water to a water output; (b) by a processor, receiving a user input via a user interface of the water supplementation unit; (c) by the processor, determining a water modification associated with the user input; (d) by the processor and based on the water modification, causing a pump of the water supplementation unit to extract a volume of chemistry from a cartridge that is coupled to the water supplementation unit and inject the volume of chemistry into the volume of water.

Example 42

The method of example 41, further comprising, by a cartridge reader, reading a set of cartridge information an identifier of the cartridge that coupled to water supplementation unit.

Example 43

The method of example 42, further comprising, by a processor, providing the set of cartridge information to a remote server via a communication device.

Example 44

The method of any one or more of examples 42 through 43, further comprising, by a processor, determining whether the cartridge that is coupled to the water supplementation unit is usable based on the set of cartridge information, and, when the cartridge is not usable, preventing the pump from extracting chemistry from the unusable cartridge.

Example 45

The method of any one or more of examples 41 through 44, wherein the pump is configured to operate in equal steps based upon control signals from the processor, the method further comprising, by the processor: (a) determining the volume of chemistry associated with the water modification; (b) determining a number of steps that corresponds to the volume of chemistry; and (c) operating the pump based upon the determined number of steps.

Example 46

The method of any one or more of examples 41 through 45, further comprising, by a filtration module, filtering the volume of water as it passes through water supplementation unit to separate a set of contaminants from the volume of water.

Example 47

The method of any one or more of examples 41 through 46, further comprising: (a) by the processor, receiving a set of cartridge information from a cartridge reader in response to the cartridge being coupled to the water supplementation unit; (b) by the processor, identifying a chemistry associated with the cartridge based on the set of cartridge information.

Example 48

The method of example 47, further comprising: (a) by the processor, determining one or more use limitations associated with the chemistry based on the set of cartridge information and a configured set of use limitations; and (b) by the processor, causing the pump to modify the volume of water based on the selected treatment and the one or more use limitations.

Example 49

The method of example 48, wherein the configured set of use limitations includes one or more of: (a) a limited number of chemistry injections over a duration of time; and (b) a limited volume of chemistry injections over the duration of time.

Example 50

The method of any one or more of examples 41 through 49, further comprising: (a) by the processor, receiving a set of cartridge information from a cartridge reader in response to the cartridge being coupled to the water supplementation unit; (b) by the processor, identifying a cartridge identifier based on the set of cartridge information; (c) by the processor, determining whether the cartridge has been previously coupled with any water supplementation unit based on the cartridge identifier and a configured set of paired cartridges; and (d) by the processor, providing a warning to the user interface where the cartridge has not been previously coupled with any cartridge receiver of the one more cartridge receivers.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A residential point of use reservoir device comprising:
   (a) a water capture device in fluid communication with a precedent use water, wherein the water capture device includes a sensor configured to provide a signal that indicates the presence of the precedent use water and a ring configured to fit around a drain at a precedent point of use, the ring including:
      (i) a raised edge that prevents the precedent use water from flowing into the drain when the precedent use water is below a depth corresponding to the height of the raised edge;
      (ii) an inlet on an exterior sidewall that allows the precedent use water to enter a cavity within the ring; and
      (iii) an outlet that couples the cavity within the ring to the first channel; wherein the sensor is positioned within the cavity of the ring and is configured to provide the signal when the precedent use water pools within the cavity of the ring;
   (b) a storage reservoir configured to hold a volume of water;
   (c) a first channel that provides a fluid connection between the water capture device and the storage reservoir;
   (d) a sensor module having sensor capabilities for determining or measuring one or more water characteristics selected from the group consisting of pH, hardness, clarity, mineral content, acidity, chemical content, particular content, microbial content, fungal content, viral content, biochemical oxygen demand, and combinations thereof;
   (e) one or more cartridge receivers;
   (f) one or more injection nozzles in fluid communication with the storage reservoir;
   (g) one or more pumps, wherein each pump:
      (i) is coupled to at least one of the one or more cartridge receivers;
      (ii) is coupled to an injection nozzle of the one or more injection nozzles; and
      (iii) is operable to extract a volume of additive from a cartridge that is coupled to the at least one cartridge receiver and inject the volume of additive into the volume of water via the injection nozzle;
   (h) a second channel that provides a fluid connection between the storage reservoir and a subsequent point of use;
   (i) one or more transport pumps configured to:
      (i) transport the precedent use water to the storage reservoir based on the signal from the sensor;
      (ii) transport water from the storage reservoir to the subsequent point of use; and (j) a water conditioner that comprises:
  (i) a case;
  (ii) a water input extending from the case in flow communication with the first channel;
  (iii) a water output extending from the case in flow communication with the second channel;
  (iv) the one or more cartridge receivers comprising a plurality of cartridge receivers defining a respective plurality of recesses extending into the case;
  (v) the one or more cartridges comprising a plurality of cartridges removably attached to the respective plurality of cartridge receivers; and
  (vi) the one or more injection nozzles comprising a plurality of injection nozzles within the case and in flow communication with an internal water channel between the water input and the water output, wherein each injection nozzle of the plurality of injection nozzles is configured to inject the volume of additive from one of the respective plurality of cartridges.

2. The device of claim 1, wherein each of the one or more cartridge receivers comprises a structure having a shape configured to receive and align a cartridge valve of a cartridge with a supply shaft of a pump of the one or more pumps that corresponds to that cartridge receiver.

3. The device of claim 1, wherein at least one of the first channel and the second channel includes tubing.

4. The device of claim 3, wherein the tubing comprises a first tube usable to receive water from the ring, and a second tube usable to dispose of water via the ring.

5. The device of claim 1, wherein the one or more cartridge receivers includes at least two cartridge receivers, and wherein there is a one-to-one correspondence between the one or more cartridge receivers and the one or more pumps.

6. The system of claim 1, wherein at least one pump of the one or more pumps includes:
  (a) a cylinder;
  (b) a motor operable to rotate a pinion; and
  (c) a piston shaft that includes a piston head at a distal end that is positioned within the cylinder, and a rack at a proximal end that is in contact with the pinion such that rotation of the pinion in a first rotation direction or a second rotation direction causes the piston head to displace a volume of the cylinder in a first direction and or second direction.

7. The system of claim 6, wherein the at least one pump further includes:
  (a) an input channel that is coupled to the cartridge and to an input valve of the cylinder; and
  (b) an output channel that is coupled to the injection nozzle and to an output valve of the cylinder;
  wherein operation of the motor in the first rotation direction causes the cylinder to be filled via the input channel, and operation of the motor in the second rotation direction causes the cylinder to be emptied via the output channel.

8. The system of claim 7, wherein the at least one pump is configured to operate in equal steps based upon control signals from a processor, and wherein the processor is configured to:
  (a) determine the volume of additive associated with the selected treatment;
  (b) determine a number of steps that corresponds to the volume of additive; and
  (c) operate the at least one pump based upon the determined number of steps.

9. The system of claim 1, further comprising a filtration module comprising a replaceable filter.

10. The system of claim 1, wherein an outside of the case includes a set of buttons and a set of status indicators, wherein each status indicator of the set of indicators corresponds to a respective button of the set of buttons; and
  wherein each button of the set of buttons corresponds to a respective cartridge of the plurality of cartridges such that actuation of a respective button of the set of buttons is configured to cause the additive from the cartridge corresponding to the actuated button to be injected into the internal water channel.

* * * * *